United States Patent
Takaguchi et al.

(10) Patent No.: US 9,927,825 B2
(45) Date of Patent: Mar. 27, 2018

(54) FREQUENCY STABILIZING APPARATUS FOR ISOLATED SYSTEM

(71) Applicant: Mitsubishi Electric Corporation, Chiyoda-ku (JP)

(72) Inventors: Yusuke Takaguchi, Tokyo (JP); Yasuhiro Kojima, Tokyo (JP); Masanobu Koshio, Tokyo (JP); Hiroshi Nagashima, Fukuoka (JP); Fumitoshi Nomiyama, Fukuoka (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 275 days.

(21) Appl. No.: 14/704,398

(22) Filed: May 5, 2015

(65) Prior Publication Data

US 2015/0338868 A1 Nov. 26, 2015

(30) Foreign Application Priority Data

May 23, 2014 (JP) .................................. 2014-106622

(51) Int. Cl.
*H01H 35/00* (2006.01)
*G05F 1/66* (2006.01)
(Continued)

(52) U.S. Cl.
CPC .................. *G05F 1/66* (2013.01); *H02J 3/32* (2013.01); *H02J 2003/388* (2013.01); *Y10T 307/832* (2015.04)

(58) Field of Classification Search
CPC ......... G05F 1/66; H02J 3/32; H02J 2003/388; Y10T 307/832
(Continued)

(56) References Cited

U.S. PATENT DOCUMENTS 8,560,136 B2 * 10/2013 Oi ............................ G05B 5/01
363/16
9,018,795 B2  4/2015 Koyanagi et al.
(Continued)

FOREIGN PATENT DOCUMENTS

CN  102157978 A  8/2011
CN  102246383 A  11/2011
(Continued)

OTHER PUBLICATIONS

U.S. Appl. No. 14/376,495, filed Aug. 4, 2014, 2015/0001939 A1, Yasuhiro Kojima, et al.
(Continued)

*Primary Examiner* — Kenneth B Wells
(74) *Attorney, Agent, or Firm* — Oblon, McClelland, Maier & Neustadt, L.L.P.

(57) ABSTRACT

A frequency stabilizing apparatus includes a power detecting method control amount calculator, a frequency detecting method control amount calculator, and a command value calculator. The power detecting method control amount calculator generates a first command value based on demand and supply imbalance of power in an isolated island system. The frequency detecting method control amount calculator generates a second command value based on a change in a frequency of the power in the isolated island system. The command value calculator generates a command value to be given to a first storage battery based on the first command value and the second command value.

10 Claims, 17 Drawing Sheets

(51) Int. Cl.
*H02J 3/32* (2006.01)
*H02J 3/38* (2006.01)

(58) Field of Classification Search
USPC .................................................. 700/291–298
See application file for complete search history.

(56) References Cited

U.S. PATENT DOCUMENTS

| 2007/0219755 A1 | 9/2007 | Williams et al. |
| 2011/0098866 A1 | 4/2011 | Muneshima et al. |
| 2011/0175443 A1 | 7/2011 | Koyanagi et al. |
| 2015/0001939 A1 | 1/2015 | Kojima et al. |

FOREIGN PATENT DOCUMENTS

| CN | 102709906 A | 10/2012 |
| JP | 2004-147445 | 5/2004 |
| JP | 2011-24386 | 2/2011 |
| JP | 4672525 | 4/2011 |
| JP | 2014-3778 | 1/2014 |
| WO | WO 2013/140916 A1 | 9/2013 |

OTHER PUBLICATIONS

Combined Chinese Office Action and Search Report dated Feb. 20, 2017 in Patent Application No. 201510261006.9 (with partial English translation).
Japanese Office Action dated Sep. 12, 2017 in Japanese Application 2014-106622 (with English translation), 13 pages.

\* cited by examiner

F I G . 1
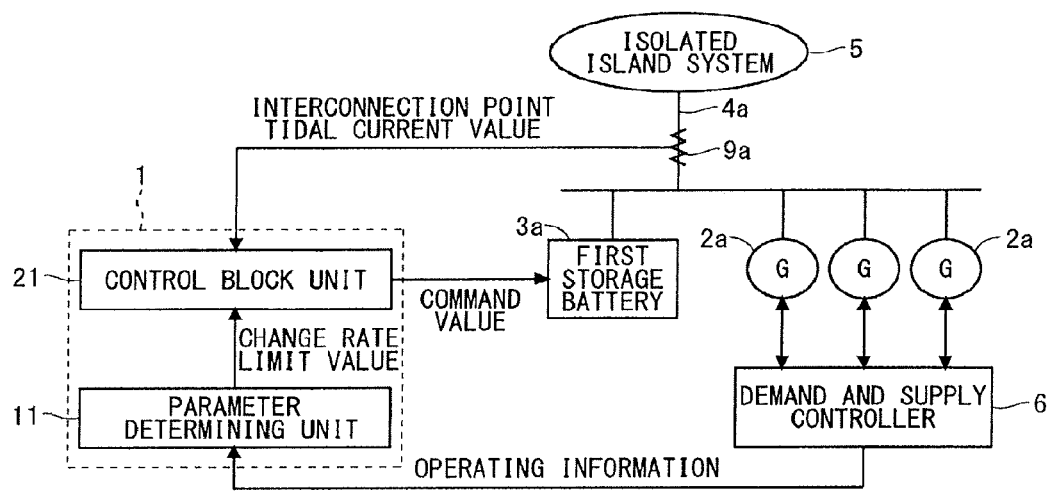
RELATED ART

RELATED ART

RELATED ART

F I G . 2 0
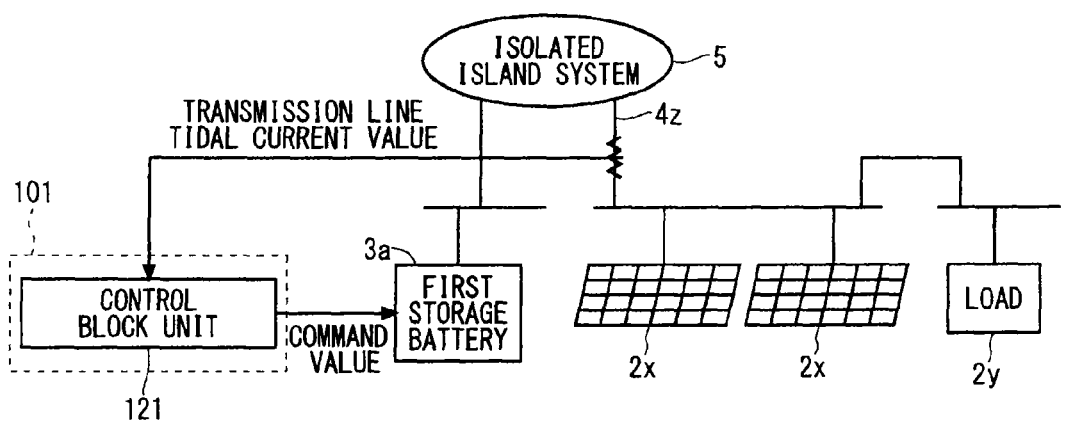

F I G . 2 4
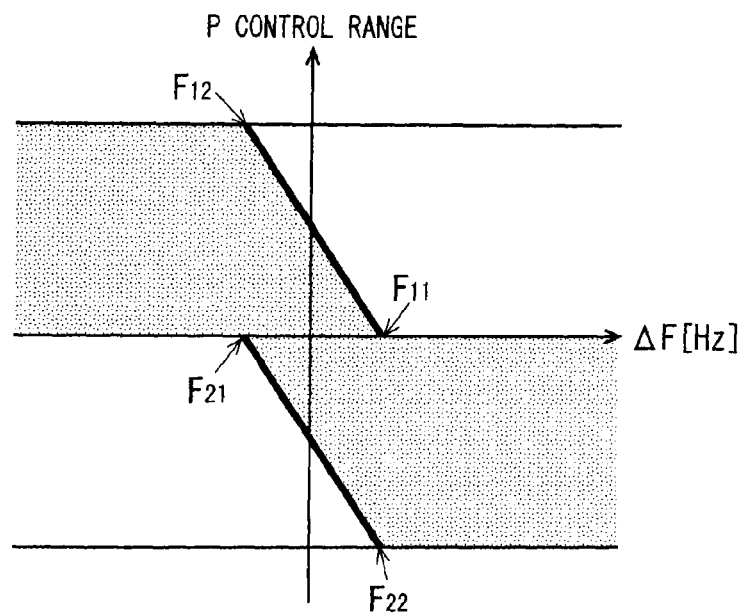
F I G . 2 5
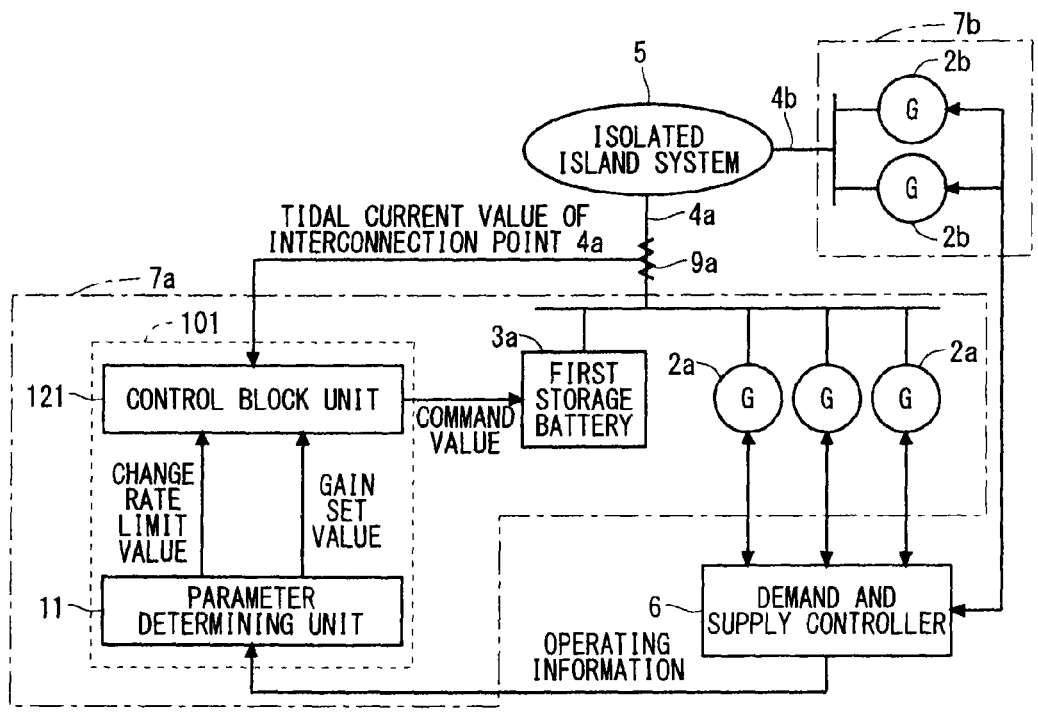

FREQUENCY STABILIZING APPARATUS FOR ISOLATED SYSTEM

BACKGROUND OF THE INVENTION

Field of the Invention

The present invention relates to a frequency stabilizing apparatus for an isolated system, which gives a control command to a storage battery capable of adjusting power on an isolated system for power supply.

Description of the Background Art

In a power plant, supply of power from a power generator is adjusted to meet a power demand changed moment by moment. A fluctuation in the power demand described herein includes a fluctuation in power consumed by a customer, and furthermore, a fluctuation in regenerable energy power generation such as wind power generation or solar power generation installed by the customer or a power generation operator, and a fluctuation caused by parallel off due to an accident.

A frequency of a power system has such a feature that the frequency is reduced if consumption is larger than supply and is increased if the consumption is smaller than the supply. In some cases in which a frequency of power is changed greatly from a specified value, however, an apparatus of the customer is affected. It is anticipated that power generating equipment is also influenced if a deviation is further increased, and service interruption occurs in the worst case. In the power plant, therefore, by performing a demand and supply operation, demand and supply balance of the power is taken in such a manner that a frequency of power is maintained to be a specified value. In the case in which a power generator or a power generator controller detects a deviation of a frequency from a reference frequency to be a reference of the frequency, usually, power supplied from the power generator is adjusted depending on the deviation, thereby controlling to return the frequency into the specified value (reference frequency).

In general, the control is delay control. In the case in which a speed of the fluctuation in the demand exceeds an adjusted speed through the power generator, moreover, the control is delayed so that the frequency deviates from the reference frequency for a while. The adjusted speed differs depending on an operating state of the power generator (a total of rated outputs of the power generator which is being operated). For example, if a total value of rated output values of the power generator which is being operated is increased, the adjusted speed is increased and can follow a high change speed.

The power supplied from the power generator has the feature described above. In recent years, introduction of a power generator for converting regenerable energy into electric energy has progressed. The regenerable energy has such a feature that a fluctuation in an output is great and the fluctuation in demand tends to exceed the adjusted speed. In the future from now, therefore, it is supposed that there is a high possibility of the occurrence of an unstable phenomenon in a frequency described above. For this reason, as in the technique disclosed in International Publication No. WO2013/140916 and Japanese Patent No. 4672525, it is variously investigated to add storage battery equipment (hereinafter referred to as a "storage battery") including a capacitor and an inverter and to stabilize a frequency by causing an output of the storage battery to follow the fluctuation in the demand which cannot be followed properly by the power generator. Such a system stabilizing method is also investigated in a large-scale power system in addition to an isolated island.

Referring to a small-scale isolated system such as an isolated island, influence of demand and supply imbalance (a shift of demand and supply balance) on a frequency is particularly large. As described above, moreover, a shift amount of the demand and supply balance and a frequency deviation (a change in a frequency from the reference frequency) are varied depending on an operating state of the power generator at that time.

On the other hand, in the technique described in the International Publication No. WO2013/140916, a command value to be given to the storage battery is generated based on an interconnection point tidal current value and a power generator change rate limit value. Consequently, a change in the output of the power generator is limited to reduce the frequency deviation, in order not to influence the frequency.

Referring to the technique disclosed in the International Publication No. WO2013/140916, however, also in the case in which the frequency deviation is not perfectly cancelled, the storage battery does not execute control for positively cancelling the frequency deviation after the interconnection point tidal current value is stabilized into a certain value. For this reason, control for stabilizing the frequency is executed by only the control of the frequency through the power generator. As a result, there is a problem in that a slight frequency deviation is present for a comparatively long period of time.

SUMMARY OF THE INVENTION

In consideration of the problems described above, it is an object of the present invention to provide a technique capable of suppressing a change in a frequency of power while controlling demand and supply imbalance of the power.

The present invention provides a frequency stabilizing apparatus for an isolated system, which gives a control command to a storage battery capable of adjusting power on an isolated system for power supply, and includes a first calculator, a second calculator and a command value calculator. The first calculator generates a first command value based on demand and supply imbalance of power in the isolated system. The second calculator generates a second command value based on a change in a frequency of the power in the isolated system. The command value calculator generates a command value to be given to the storage battery based on the first command value generated by the first calculator and the second command value generated by the second calculator. The frequency stabilizing apparatus estimates the demand and supply imbalance by using at least one of output power of power generator and power of a transmission line including the output power, the power generator being connected into the isolated system and converting rotational energy into electric energy.

It is also possible to suppress the change in the frequency of the power while controlling the demand and supply imbalance of the power.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 1 to 3 are block diagrams showing a structure of a first related apparatus;

FIGS. 12A to 14D are charts each showing an operation result of a apparatus to be compared with the frequency stabilizing apparatus according to the first preferred embodiment;

FIGS. 16 to 20 are block diagrams showing a structure of a frequency stabilizing apparatus according to a first variant of the first preferred embodiment;

FIG. 24 is a chart showing an operation of the frequency stabilizing apparatus according to the first variant of the second preferred embodiment;

FIGS. 25 to 27 are block diagrams showing a structure of a frequency stabilizing apparatus according to a third preferred embodiment.

DESCRIPTION OF THE PREFERRED EMBODIMENTS

First Preferred Embodiment

Figure 2:
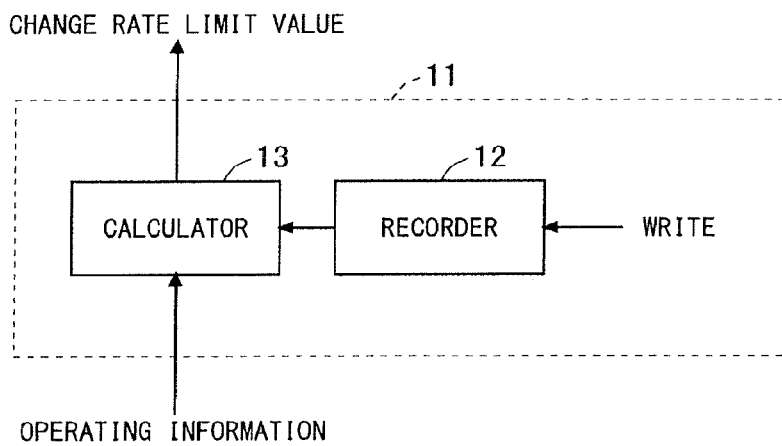

Before description of a frequency stabilizing apparatus for an isolated system (hereinafter referred to as a "frequency stabilizing apparatus") according to a first embodiment of the present invention, explanation will be first given to a first frequency stabilizing apparatus (hereinafter referred to as a "first related apparatus") and a second frequency stabilizing apparatus (hereinafter referred to as a "second related apparatus") which are related to frequency stabilizing apparatus according to the first embodiment.

<First Related Apparatus>

Herein, a first related apparatus will be described. FIG. 1 is a block diagram showing structures of the first related apparatus and a system stabilizing system including the same. As shown in FIG. 1, the first related apparatus 1, a plurality of first power generators 2a, and a first storage battery 3a are connected to an isolated island system 5 (an isolated system for power supply in an isolated island) by a first interconnection line 4a. Consequently, the first storage battery 3a can adjust power on the isolated island system 5, and power of the first power generator 2a can be supplied to the isolated island system 5 through the first interconnection line 4a.

The first related apparatus 1 to be a frequency stabilizing apparatus gives a control command to the first storage battery 3a. Herein, it is assumed that the first related apparatus 1, the first power generator 2a and the first storage battery 3a are provided in the same power plant. Moreover, the first power generator 2a and the first storage battery 3a are the same as a power generator 82 and a storage battery 83 which will be described below.

A demand and supply controller 6 outputs a starting command and an output command to the first power generator 2a while determining demand and supply balance of power (corresponding to a demand and supply fluctuation) in the isolated island system 5. Consequently, the starting and output of the first power generator 2a is controlled. Moreover, the demand and supply controller 6 periodically outputs, to the first related apparatus 1, operating information including information about the first power generator 2a which is being operated. Herein, it is assumed that the operating information indicates a total value of rated outputs in the whole first power generators 2a which are being operated.

A first measuring unit 9a provided on the first interconnection line 4a periodically measures a total value of effective power to be output (supplied) to the isolated island system 5 through the first interconnection line 4a by the first power generator 2a and the first storage battery 3a. The total value measured by the first measuring unit 9a (a value of power including at least power to be output to the isolated island system 5 by the first power generator 2a) will also be hereinafter referred to as an "interconnection point tidal current value". The first measuring unit 9a periodically outputs the measured interconnection point tidal current value to the first related apparatus 1.

The first related apparatus 1 gives the first storage battery 3a a control command for controlling the output of the first storage battery 3a based on the operating information sent from the demand and supply controller 6 and a change in the interconnection point tidal current value sent from the first measuring unit 9a (a value corresponding to the demand and supply imbalance of the power in the isolated island system 5). The first related apparatus 1 includes a parameter determining unit 11 and a control block unit 21 as shown in FIG. 1.

The parameter determining unit 11 obtains a change rate limit value (an output change rate limit value) indicative of a limit imposed on a total value in the output change of the whole first power generators 2a which are being operated based on the operating information sent from the demand and supply controller 6, and outputs the change rate limit value to the control block unit 21. The control block unit 21 generates a command value (a control command) to be given to the first storage battery 3a based on an interconnection point tidal current value of the first interconnection line 4a sent from the first measuring unit 9a (a total value of outputs of the first power generator 2a and the first storage battery 3a in the first interconnection line 4a) and the change rate limit value obtained by the parameter determining unit 11, and outputs the command value to the first storage battery 3a.

FIG. 2 is a block diagram showing a structure of the parameter determining unit 11. As shown in FIG. 2, the parameter determining unit 11 includes a recorder 12 and a calculator 13.

The recorder 12 records a rate limit value (a predetermined limit value) which is rewritable by using any rewriting means such as a keyboard, a touch panel or a communicating unit. For example, in the case in which an output change for one minute of the first power generator 2a which is being operated is equal to or smaller than 3% of the rated output, the rate limit value is defined to be (3%)/(one minute) if the frequency of the power output from the first power generator 2a is rarely influenced. In other words, a value obtained by dividing, by the rated output, the output change of the first power generator 2a which rarely influences the frequency of the power, from among the first power generator 2a which is being operated is recorded as the rate limit value. Herein, it is assumed that the rate limit values of all the first power generators 2a in the isolated island are adjusted to be equal to each other.

The calculator 13 calculates a change rate limit value by performing a multiplication shown in the following equation (1) based on the rate limit value recorded in the recorder 12 and operating information sent from the demand and supply controller 6 (herein, a total value of the rated outputs of all the first power generators 2a which are being operated). Consequently, the calculator 13 outputs the calculated change rate limit value to the control block unit 21.

[Equation 1]

Change rate limit value="rate limit value"דtotal rated output of first power generators which are being operated" (1)

The change rate limit value indicates a limit imposed on the total value of the output changes in the whole first power generators 2a which are being operated as described above. When the output changes of the whole first power generators 2a which are being operated are limited by the change rate limit value calculated herein, accordingly, the output changes of all the first power generators 2a which are being operated can be limited into a range in which the interconnection point tidal current value can be varied without influencing the frequency of the power.

Figure 3:
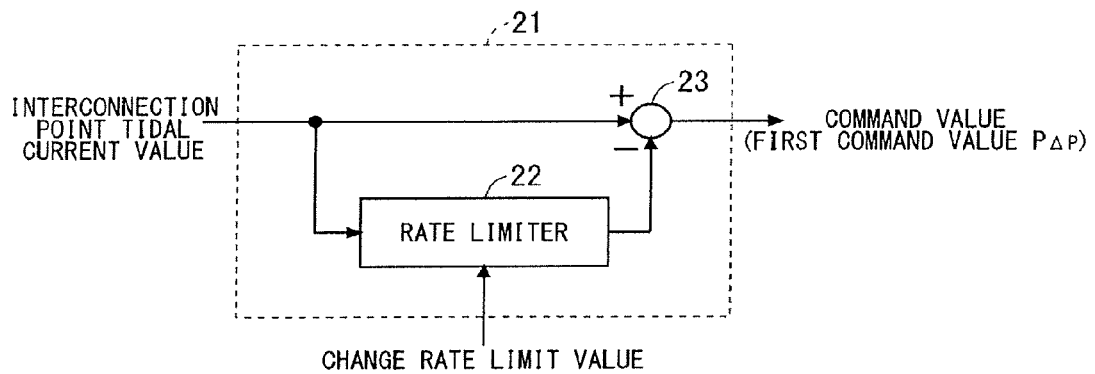

FIG. 3 is a block diagram showing a structure of the control block unit 21. As shown in FIG. 3, the control block unit 21 includes a rate limiter 22 and a subtracter 23.

An interconnection point tidal current value sent from the first measuring unit 9a and a change rate limit value sent from the parameter determining unit 11 are input to the rate limiter 22. The rate limiter 22 is a circuit which generates the interconnection point tidal current value whose temporal change is limited by using the change rate limit value. The rate limiter 22 exactly outputs the interconnection point tidal current value when a change in the input interconnection point tidal current value is equal to or smaller than the change rate limit value. On the other hand, the rate limiter 22 outputs an interconnection point tidal current value whose change is a rate limit value when the change in the input interconnection point tidal current value exceeds the change rate limit value.

Figure 4:
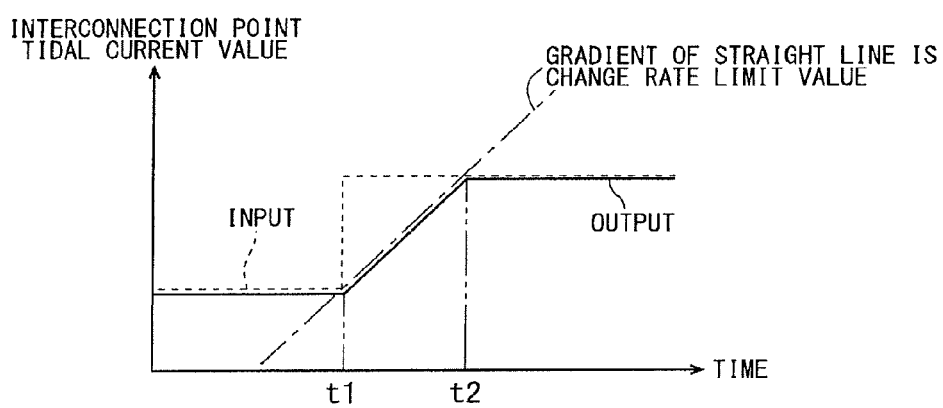
FIG. 4 is a chart showing an operation of the first related apparatus.

FIG. 4 is a chart showing the operation of the rate limiter 22. In FIG. 4, the interconnection point tidal current value input to the rate limiter 22 is shown in a broken line, a straight line having a gradient corresponding to the change rate limit value is shown in a dashed line, and the interconnection point tidal current value output from the rate limiter 22 is shown in a solid line. As shown in FIG. 4, if the input interconnection point tidal current value is changed in a step shape, the rate limiter 22 outputs the interconnection point tidal current value which is changed with the gradient of the change rate limit value for a while (between t1 and t2 in an example shown in FIG. 4). After the input interconnection point tidal current value is equal to an interconnection point tidal current value to be output (t2 in the example shown in FIG. 4), the rate limiter 22 exactly outputs the input interconnection point tidal current value.

Returning to FIG. 3, the interconnection point tidal current value sent from the first measuring unit 9a and the interconnection point tidal current value sent from the rate limiter 22 are input to the subtracter 23. The subtracter 23 generates, as command values, a difference between interconnection point tidal current values before and after the limitation of the change through the rate limiter 22 (a difference between the interconnection point tidal current value sent from the first measuring unit 9a and the interconnection point tidal current value sent from the rate limiter 22). A signal indicative of the command value generated by the subtracter 23 is output as an analog value or a digital value to the first storage battery 3a. In a frequency stabilizing apparatus 101 according to a first preferred embodiment which will be described below, the difference between the interconnection point tidal current values generated by the subtracter 23 is used as a first command value.

Upon receipt of the command value from the first related apparatus 1, the first storage battery 3a outputs (discharges) or inputs (charges) power having a coincident value with the command value.

<First Variant of First Related Apparatus>

The first related apparatus 1 generates a command value (a control amount) to be given to the first storage battery 3a based on the operating information sent from the demand and supply controller 6 and the interconnection point tidal current value in the first interconnection line 4a which is measured by the first measuring unit 9a.

In other words, it is necessary to connect the demand and supply controller 6 to the first related apparatus 1. However, on the supposition that the first related apparatus 1 is newly installed in a power system provided with the demand and supply controller 6, it is necessary to newly prepare a communication line between the demand and supply controller 6 and the first related apparatus 1 or to modify the existing demand and supply controller 6.

Therefore, in order to avoid the preparation of the communication line or the modification of the existing demand and supply controller 6, it is also possible to generate a command value (a control amount) to be given to the first storage battery 3a based on the interconnection point tidal current value in the first interconnection line 4a measured by the first measuring unit 9a without using the operating information sent from the demand and supply controller 6. The first related apparatus 1 according to the first variant will be described below.

Figure 5:
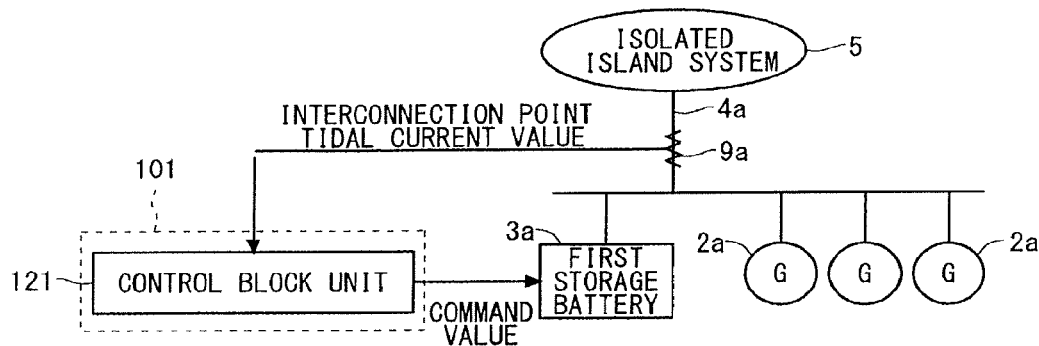
FIGS. 5 and 6 are block diagrams showing a structure of a frequency stabilizing apparatus according to a first variant of the first related apparatus.

FIG. 5 is a block diagram showing structures of the first related apparatus 1 according to the first variant and a system stabilizing system including the same. The first related apparatus 1 in FIG. 5 includes the control block unit 121 and does not include the parameter determining unit 11.

Figure 6:
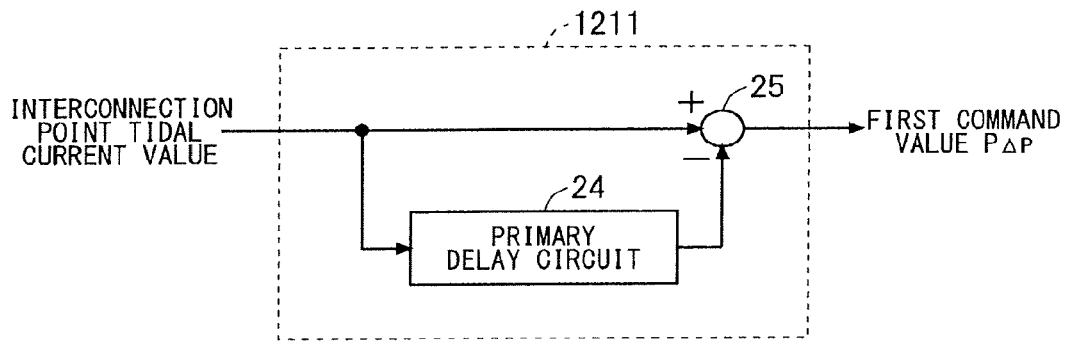

FIG. 6 is a block diagram showing a structure of the control block unit 1211 according to the first variant. The control block unit 1211 in FIG. 6 includes a primary delay circuit 24 which outputs a primary delay signal of an input (the interconnection point tidal current value of the first interconnection line 4a) and a subtracter 25 which outputs a difference between the interconnection point tidal current value of the first interconnection line 4a and the output of the primary delay circuit 24.

Figure 7:
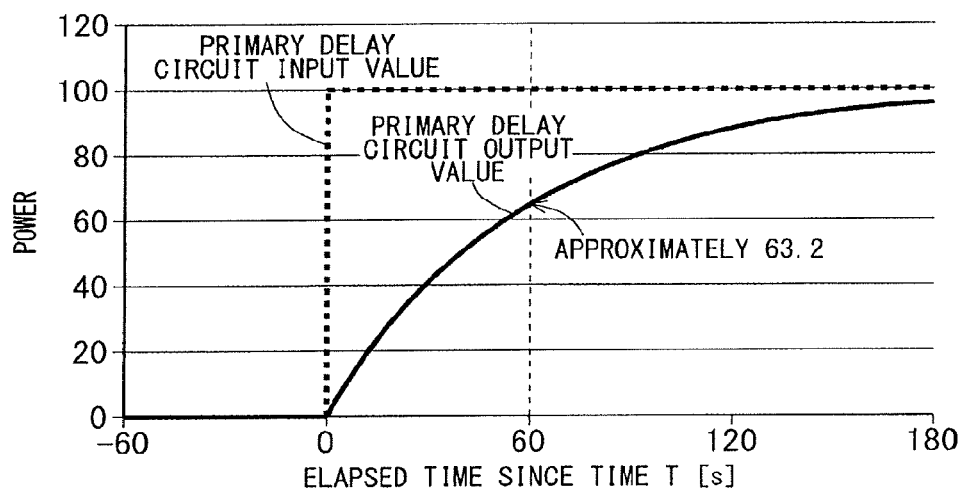
FIG. 7 is a chart showing an operation of the frequency stabilizing apparatus according to the first variant of the first related apparatus.

FIG. 7 is a chart showing an example of an operation of the primary delay circuit 24. For example, in the case in which a primary delay time constant is set to be 60 seconds in the primary delay circuit 24, an output value of the primary delay circuit 24 is changed by approximately 63.2 after 60 seconds since a time T (=0), when the interconnection point tidal current value is changed by 100 at the time T (=0) as shown in FIG. 7. In the first variant, the primary delay time constant in the primary delay circuit 24 is set in accordance with a following capability of the first power generators 2a connected to a system (a capability that the first power generator 2a can change the interconnection point tidal current value without influencing a frequency of power).

According to the first related apparatus 1 in accordance with the first variant, the first storage battery 3a can be caused to share a sudden changed portion of the interconnection point tidal current value that the power generator cannot follow (a sudden changed portion of the interconnection point tidal current value, which influences the frequency of the power). Therefore, even if the accurate change rate limit value of the first power generator 2a is not used, and furthermore, the operating information is not acquired from the demand and supply controller 6, it is possible to calculate a first command value required for frequency stabilization (a power detecting method output $P_{AP}$ which will be described below). Although the first related apparatus 1 and the present variant are applied to the first preferred embodiment as will be described below, the present invention is not restricted thereto but can also be applied to a second preferred embodiment and others, for example.

<Demerit of First Related Apparatus>

According to the first related apparatus 1 described above, the command value to be given to the first storage battery 3a is generated based on the demand and supply imbalance of the power of the isolated island system 5 (herein, a change in the interconnection point tidal current value of the first interconnection line 4a), thereby controlling the input/output of the first storage battery 3a. As a result, it is possible to reduce a frequency deviation (a change in a frequency from a reference frequency). However, also in the case in which the frequency deviation is not perfectly cancelled, the first storage battery 3a does not positively execute control for cancelling the frequency deviation after the interconnection point tidal current is stabilized into a certain value. For this reason, the control for stabilizing a frequency is executed by only the control of the frequency through the first power generator 2a. As a result, a slight frequency deviation is present for a comparatively long period of time.

<Second Related Apparatus>

Figure 8:
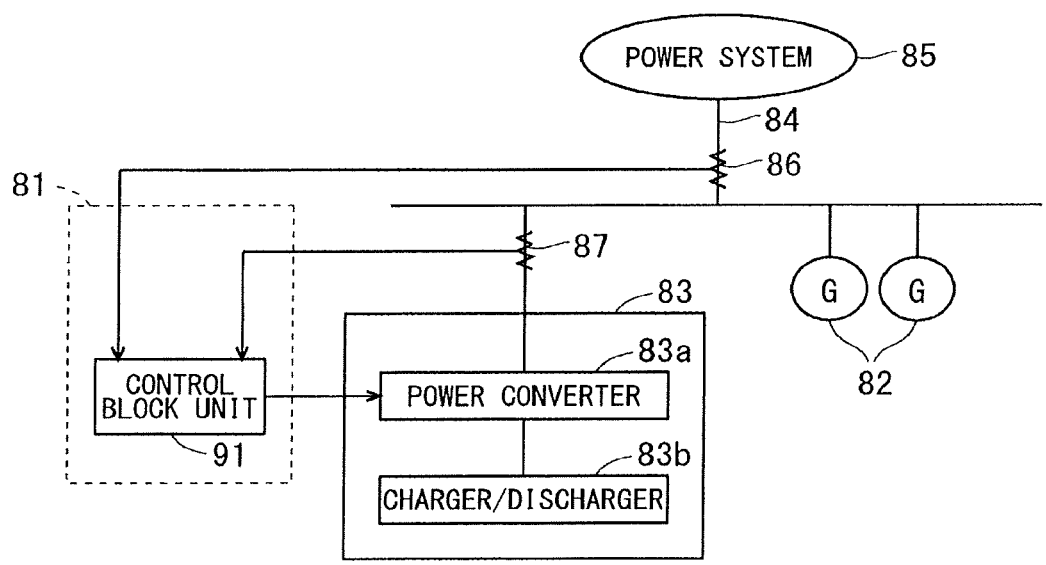
FIGS. 8 and 9 are block diagrams showing a structure of a second related apparatus.

Next, a second related apparatus will be described. FIG. 8 is a block diagram showing structures of the second related apparatus and a system stabilizing system including the same. As shown in FIG. 8, a second related apparatus 81, a plurality of power generators 82 and a single storage battery 83 are connected to a power system 85 through an interconnection line 84. Herein, the power system 85 supposes a small-scale power supply isolated system provided on an isolated island, and the second related apparatus 81, the power generator 82 and the storage battery 83 configure a dispersion type power distribution system (microgrid) partially taking charge of the power system 85. The second related apparatus 81 to be the frequency stabilizing apparatus gives a control command to the storage battery 83 capable of adjusting power on the power system 85 for power supply.

The power generator 82 to be introduced into the isolated island has a control characteristic of a governor for a demand and supply fluctuation, and the output (power supply) of each power generator 82 is adjusted to equally follow a load (power demand). For this reason, in the case in which a sudden change in a demand, an output fluctuation of regenerable energy, or a sharp load fluctuation with parallel off which is caused by a failure or an accident of a power generator of the regenerable energy occurs, the power generator 82 which is being operated takes charge of an output corresponding to the fluctuation portion at an equal ratio. According to such a power generator 82, it is possible to deal with the fluctuation in the power demand to some degree.

However, in the case in which the fluctuation in the power demand is excessively sudden, a response speed of a fuel system of the power generator 82 (a diesel motor in the case of an internal combustion power generator, a boiler in the case of an energy power generator, or the like) is low so that the response of the fuel system cannot instantly carry out follow-up even if the output of the power generator 82 can rapidly respond. In this case, therefore, energy supply through a mechanical input of the fuel system greatly deviates from energy consumption caused by conversion into electric energy with respect to rotational energy possessed by a rotor of the power generator 82. As a result, if there is continuously set a situation in which the demand and the supply of the power are unbalanced, an unstable phenomenon occurs, that is, the rotational energy of the power generator is decreased or increased as compared with a reference value so that the frequency of the whole system is gradually reduced or raised, resulting in a change from a reference frequency.

Such an unstable phenomenon appears more remarkably with reduction in the scale of the power system. Therefore, in the case in which it is assumed to introduce power of the regenerable energy in a large amount to a small-scale power system such as an isolated island, the storage battery 83 capable of performing high-speed output adjustment at a stable frequency is provided. According to the structure including the storage battery 83, it is possible to reduce the unstable phenomenon of the frequency, that is, the frequency deviation (the change in the frequency from the reference frequency) more greatly.

Next, description will be given of an example of the structures of the storage battery 83 and the second related apparatus 81.

As shown in FIG. 8, the storage battery 83 includes a power converter 83a formed by an inverter or the like, and a charger/discharger 83b such as an electric double layer capacitor, for example. The power converter 83a converts AC power to be input to the storage battery 83 into DC power and charges the DC power to the charger/discharger 83b, and converts the DC power discharged from the charger/discharger 83b into AC power and outputs the AC power from the storage battery 83, in response to the control command of the second related apparatus 81.

The second related apparatus 81 includes a control block unit 91. The control block unit 91 outputs a control command to the power converter 83a based on a frequency of power detected by a detector 86 or a detector 87. Frequencies of power in optional places of the same system are almost equal to each other and almost equal frequencies (the power system 85) are detected in the detectors 86 and 87.

Figure 9:
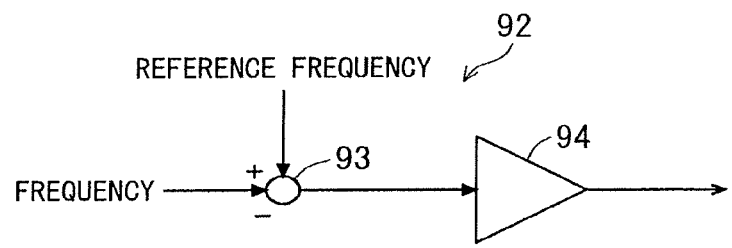

FIG. 9 is a block diagram showing a structure of a fluctuation detecting block 92 provided in the control block unit 91. As shown in FIG. 9, the fluctuation detecting block 92 of the control block unit 91 includes a subtracter 93 and an amplifier 94.

The subtracter 93 subtracts a frequency of an isolated system from a preset reference frequency and outputs a frequency deviation thus obtained. The amplifier 94 multiplies the frequency deviation output from the subtracter 93 by a gain, thereby outputting a control command value to the storage battery 83.

In the case in which the microgrid configured from the second related apparatus 81 is operated as an isolated system, a change (frequency deviation) in a frequency of power is detected so that input/output of the storage battery 83 is corrected (controlled). For example, in the case in which a frequency (for example, 60.05 Hz) of power detected by the detector 86 or the detector 87 is higher than a reference frequency (for example, 60 Hz), the control block unit 91 controls the storage battery 83 to reduce the output of the storage battery 83. To the contrary, in the case in which the frequency (59.95 Hz) of the power detected by the detector 86 or the detector 87 is lower than the reference frequency (for example, 60 Hz), the control block unit 91 controls the storage battery 83 to raise the output of the storage battery 83. In the case in which the scale of a control amount is varied depending on the system and is raised by 0.05 Hz from the reference frequency in a small-scale system provided in an isolated island, power of 50 kW (=1000×0.05) having a gain of approximately 1000 (kw/Hz) applied thereto is charged into the storage battery 83, for example.

A method of calculating a frequency may calculate a frequency by measuring a time interval passing through a zero point of a power AC waveform (which may be an intermediate value between an MAX value and an MIN value) or may calculate the frequency from a voltage value at an electric angle of less than 90 degrees or less than 180 degrees, for example. The structure of the fluctuation detecting block 92 is not restricted to the structure in FIG. 9. In order to absorb the fluctuation in the frequency, for example, the primary delay signal having the frequency obtained as described above may be input in place of the reference frequency, thereby acquiring the control amount.

<Demerit of Second Related Apparatus>

According to the second related apparatus 81 described above, a command value to be given to the storage battery 83 is generated based on a change in the frequency of the power of the power system 85, thereby controlling input/output of the storage battery 83. Consequently, it is possible to suppress the change in the frequency (the frequency deviation). However, as described above, the change in the frequency gradually occurs depending on the demand and supply imbalance (a shift of the demand and supply imbalance) and the change in the frequency is detected to control the output of the storage battery 83. For this reason, the change in the frequency cannot be reduced in a short time. In addition, the number of the operated power generates 82 to be started and stopped is varied corresponding to the demand and supply fluctuation. Therefore, it is hard to previously determine a proper gain (kW/Hz).

On the other hand, according to the frequency stabilizing apparatus in accordance with the first preferred embodiment, it is possible to reduce the frequency deviation of the power, and furthermore, to positively cancel the residual frequency deviation. The frequency stabilizing apparatus will be described below.

<Frequency Stabilizing Apparatus According to First Preferred Embodiment>

Figure 10:
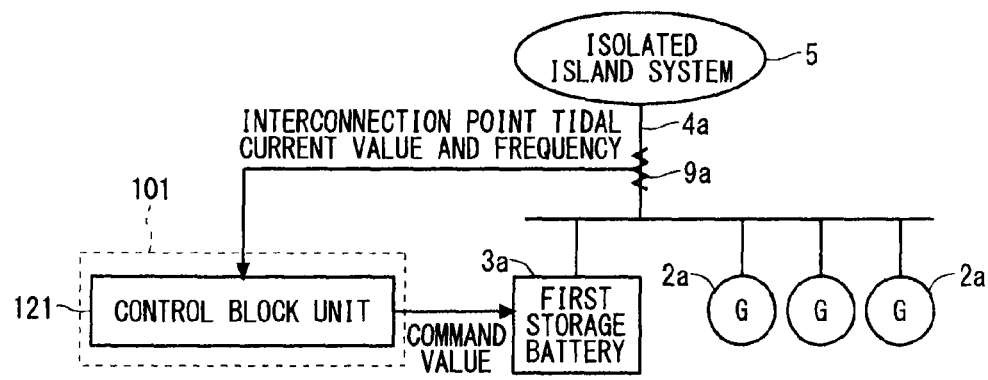
FIG. 10 is a block diagram showing structures of frequency stabilizing apparatus according to first or second preferred embodiments.

FIG. 10 is a block diagram showing structures of the frequency stabilizing apparatus according to the first preferred embodiment and a stabilizing system including the same. The power of the first power generator 2a can be supplied to the isolated island system 5 through the first interconnection line 4a in the same manner as described above. Since portions excluding the frequency stabilizing apparatus 101 are the same as described above, explanation for them will be omitted.

The frequency stabilizing apparatus 101 outputs a command value to the first storage battery 3a capable of adjusting power on the isolated island system (the isolated system for power supply) 5, thereby giving a control command to the first storage battery 3a in the same manner as in the first related apparatus 1 and the second related apparatus 81.

More specifically, the frequency stabilizing apparatus 101 calculates the control amount of the first storage battery 3a to generate the command value to be given to the first storage battery 3a based on the operating information sent from the demand and supply controller 6, and the interconnection point tidal current value in the first interconnection line 4a and the frequency of the power, both being measured by the first measuring unit 9a.

The frequency stabilizing apparatus 101 in FIG. 10 includes a control block unit 121.

Figure 11:
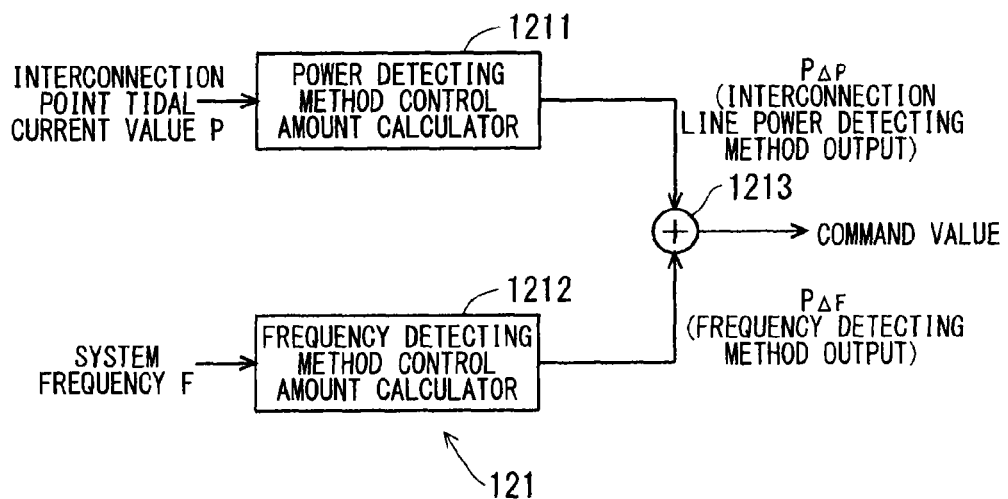
FIG. 11 is a block diagram showing the structure of the frequency stabilizing apparatus according to the first preferred embodiment.
Figure 12:
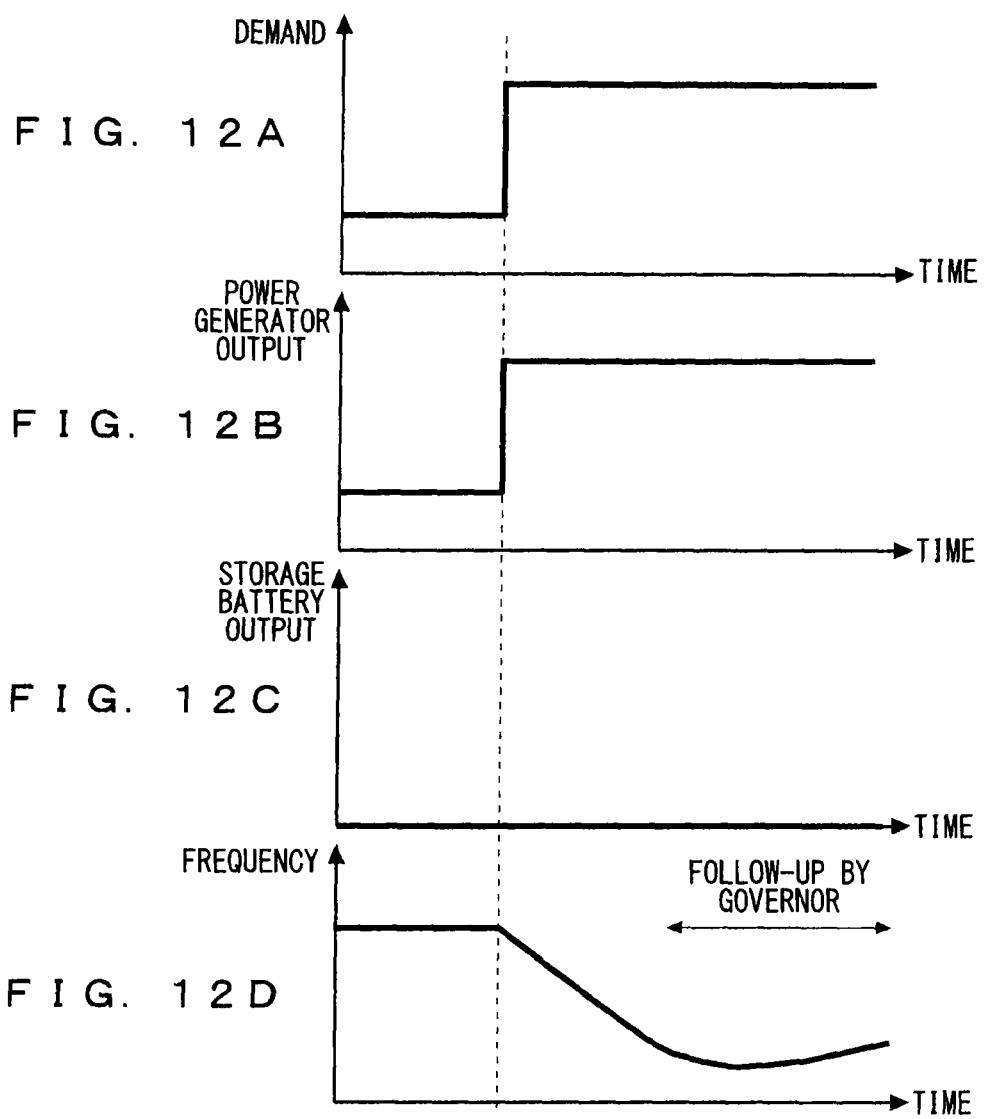
Figure 13:
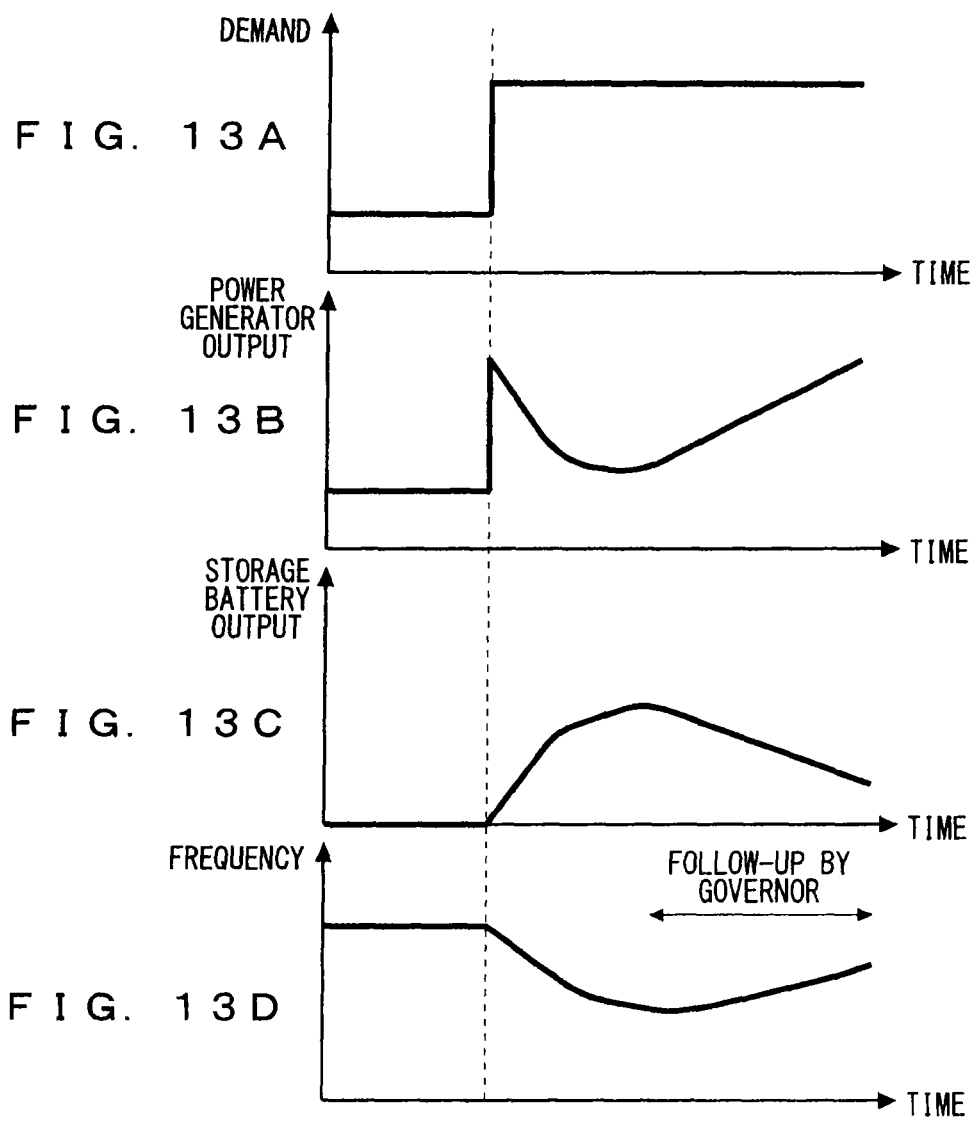
Figure 14:
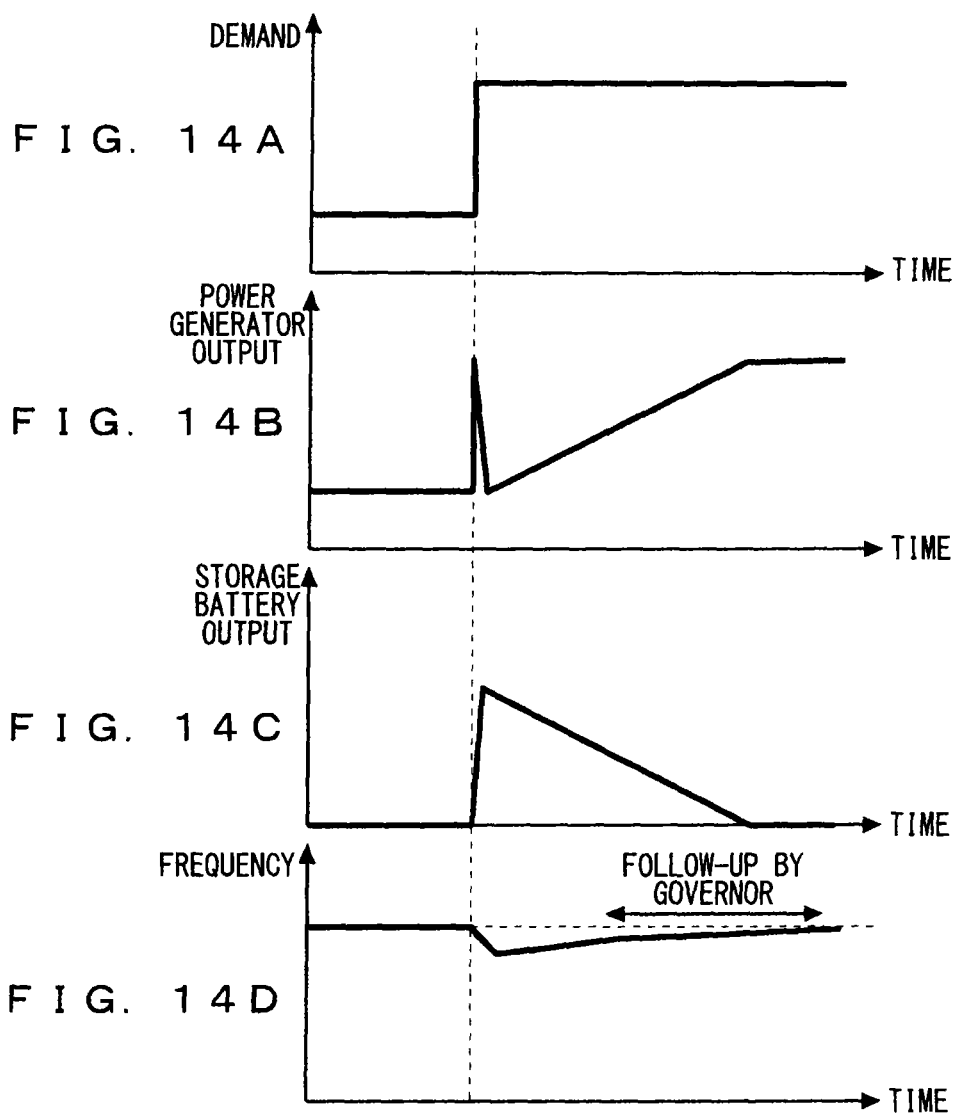

FIG. 11 is a block diagram showing a structure of the control block unit 121. As shown in FIG. 11, the control block unit 121 includes a power detecting method control amount calculator (a first calculator) 1211, a frequency detecting method control amount calculator (a second calculator) 1212 and a command value calculator 1213.

The power detecting method control amount calculator 1211 has the same structure as the control block unit 1211 (FIG. 6) according to the first variant of the first related apparatus 1. The power detecting method control amount calculator 1211 thus configured generates the power detecting method output $P_{AP}$ (the first command value) based on the demand and supply imbalance of power in the isolated island system 5 (a demand and supply fluctuation, corresponding to a change in the interconnection point tidal current value of the first interconnection line 4a).

However, the present invention is not restricted thereto but the power detecting method control amount calculator 1211 may accurately calculate a control amount by using the change rate limit value obtained by the parameter determining unit 11 like the control block unit 21 (FIG. 3) of the first related apparatus 1, thereby generating, as the power detecting method output $P_{AP}$ (the first command value), the command value of FIG. 3 thus obtained.

The frequency detecting method control amount calculator 1212 has the same structure as the control block unit 91 of the second related apparatus 81. The frequency detecting method control amount calculator 1212 thus configured generates a frequency detecting method output $P_{AF}$ (a second command value) based on the change in the frequency of the power of the first interconnection line 4a (the change in the frequency of the power in the isolated island system 5). According to such a frequency detecting method control amount calculator 1212, it is possible to cancel a frequency deviation based on a system frequency, that is, the frequency of the power in the isolated island system 5.

A command value calculator 1213 generates a control command value (a command value) to be given to the first storage battery 3a based on the power detecting method output $P_{AP}$ generated by the power detecting method control amount calculator 1211 and the frequency detecting method output $P_{AF}$ generated by the frequency detecting method control amount calculator 1212. Herein, an adder is applied to the command value calculator 1213 and generates a total value of the power detecting method output $P_{AP}$ and the frequency detecting method output $P_{AF}$ as the control command value to be given to the first storage battery 3a.

<Effect>

FIGS. 12A to 14D are charts each showing an operation result of a apparatus to be compared with the frequency stabilizing apparatus 101 according to the first preferred embodiment, for example, the first related apparatus 1 and the second related apparatus 81. FIGS. 15A to 15D are charts each showing the operation result of the frequency stabilizing apparatus 101 according to the first preferred embodiment.

FIGS. 12A, 13A, 14A and 15A are charts showing a time change in demand power, FIGS. 12B, 13B, 14B and 15B are charts showing a time change in a power generator output, FIGS. 12C, 13C, 14C and 15C are charts showing a time change in a storage battery output, and FIGS. 12D, 13D, 14D and 15D are charts showing a time change in a frequency.

FIGS. 12A to 12D each show an operation in the case in which output adjustment of the first storage battery 3a is not carried out. In this case, the first storage battery 3a does not follow a stepped increase in the demand power as shown in FIG. 12C, and only the first power generator 2a follows the stepped increase as shown in FIG. 12B. As described above, control on a motor side through a governor is temporarily delayed. Referring to the rotational energy of the rotor of the first power generator 2a, therefore, energy consumption caused by conversion into electric energy is increased more greatly than energy supply through a mechanical input from the motor.

As a result, as shown in FIG. 12D, the frequency of the power is reduced greatly. Then, the governor detects a reduction in the frequency, and it is anticipated that rotational energy to be given from the motor side is increased and the frequency of the power is recovered but an apparatus of a customer is badly influenced by a reduction in the frequency of the power which occurs temporarily.

FIGS. 13A to 13D each show the operation of the second related apparatus 81. In other words, there is shown an operation in the case in which the outputs of the first power generator 2a and the first storage battery 3a are controlled by using frequency measuring information without the use of interconnection point measuring information. In this case, the output of the first storage battery 3a is increased as shown in FIG. 13C with respect to the stepped increase in the demand power. However, an actual frequency is detected to carry out control as compared with a frequency reference value. For this reason, the control slightly contributes for a period in which the change in the frequency is small, and the output of the first storage battery 3a is gradually increased.

As a result, as shown in FIG. 13D, the frequency deviation (the unstable phenomenon of the frequency) is suppressed more greatly than in the case shown in FIG. 12D (the case in which the output adjustment of the first battery storage 3a is not carried out), and the frequency deviation is comparatively great and a period of the frequency deviation is also comparatively long. If a rise in the output of the first storage battery 3a is implemented to be quickened, it is possible to suppose a method of increasing a gain or adding differential control.

FIGS. 14A to 14D each show the operation of the first related apparatus 1. In other words, there is shown an operation in the case in which the outputs of the first power generator 2a and the first storage battery 3a are controlled by using interconnection point tidal current information without the use of the frequency measuring information. The output of the first power generator 2a instantly follows a change in the demand power as shown in FIG. 14B with respect to the stepped increase in the demand power. On the other hand, the change in the demand power is detected as the interconnection point tidal current value. In the case in which the change in the interconnection point tidal current value is so great as to influence the frequency of the power of the first power generator 2a, the first power generator 2a is caused to output the change within a range that the frequency of the power of the first power generator 2a is not influenced, and furthermore, a command is given to immediately output a difference between the interconnection point tidal current value and the output of the first power generator 2a to the first storage battery 3a.

For this reason, the changed portion of the demand power is compensated by the output of the first storage battery 3a and the output of the first power generator 2a is immediately returned to almost the same value as an original value (reduced) as shown in FIG. 14C. As a result, the output of the first power generator 2a brings into a value with a small influence on a frequency. Therefore, the change in the frequency of the power is reduced more greatly as shown in FIG. 14D. However, the frequency is not detected. For this reason, after the interconnection point tidal current is stabilized into a certain value, a residual portion of the frequency deviation continuously remains until the effect of the governor control in the first power generator 2a is produced.

Figure 15:
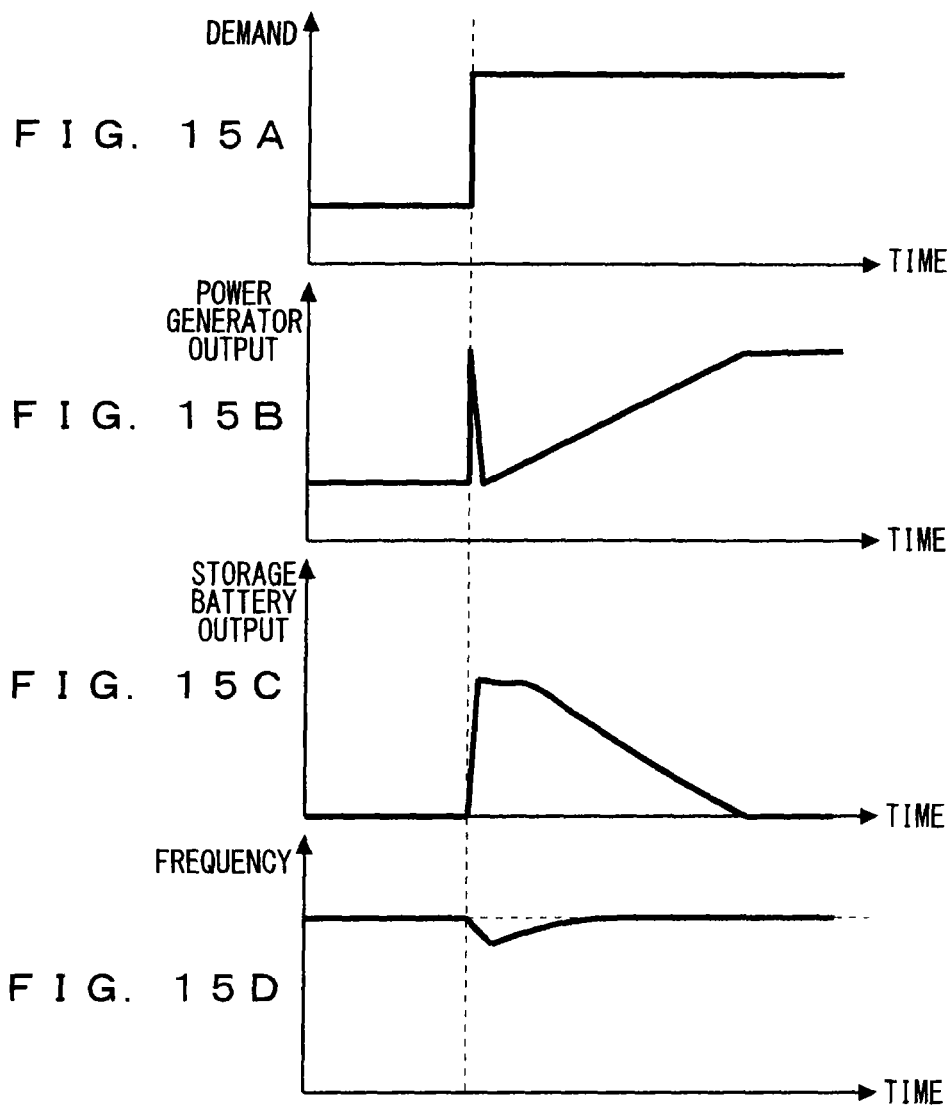
FIGS. 15A to 15D are charts each showing an operation result of the frequency stabilizing apparatus according to the first preferred embodiment.

FIGS. 15A to 15D each show an operation to be implemented by the frequency stabilizing apparatus 101 according to the first preferred embodiment. There is shown an operation in which both the frequency measuring information and the interconnection point tidal current information are used to control the outputs of the first power generator 2a and the first storage battery 3a. As shown in FIG. 15C, the first power generator 2a is operated to reduce the influence on the frequency by using the interconnection point tidal current information in the same manner as in FIG. 14C. Moreover, as shown in FIG. 15D, the control amount of the first power generator 2a is further calculated to cancel the frequency deviation by using the frequency measuring information even after the interconnection point tidal current is stabilized into a certain value. Therefore, it is possible to carry out control for adapting the frequency into the reference frequency without waiting for the governor control of the first power generator 2a.

The above description will be summarized. According to the frequency stabilizing apparatus 101 in accordance with the first preferred embodiment, the power detecting method output $P_{AP}$ (the first command value) is calculated based on the demand and supply imbalance of the power (the change in the interconnection point tidal current value of the first interconnection line 4a) in the isolated island system 5 to be changed moment by moment, and furthermore, the power detecting method output $P_{AF}$ (the second command value) is calculated based on the change in the frequency of the power in the isolated island system 5. Then, the command value to be given to the first storage battery 3a is generated based on the power detecting method output $P_{AP}$ and the frequency detecting method output $P_{AF}$. Thus, the command value to be given to the first storage battery 3a is generated based on the power detecting method output $P_{AP}$. Therefore, even if the demand and supply imbalance of the isolated island system 5 (the change in the interconnection point tidal current value of the first interconnection line 4a) occurs, it is possible to mainly deal with the demand and supply imbalance by using the output of the first storage battery 3a. As a result, for example, the total value of the output changes in all the first power generators 2a which are being operated can be limited in order not to influence the frequency of the power. Therefore, it is possible to suppress the change in the frequency of the power. Moreover, the command value to be given to the first storage battery 3a is generated based on the frequency detecting method output $P_{AF}$ (the second command value) capable of positively cancelling the frequency deviation. Therefore, it is possible to positively cancel the residual portion of the frequency deviation.

<First Variant>

In the frequency stabilizing apparatus 101 according to the first preferred embodiment (FIG. 10) and the first related apparatus 1 applied partially to the frequency stabilizing apparatus 101 (FIGS. 1 and 5), there is measured the interconnection point tidal current value of the interconnection line (the first interconnection line 4a) between the first storage battery 3a and the isolated island system 5 to be a target system, and the change in the interconnection point tidal current value is applied as the demand and supply imbalance of the power in the isolated island system 5.

On the other hand, in the frequency stabilizing apparatus 101 according to the first variant, the interconnection point tidal current value is not measured but a change in the power to be output to the isolated island system 5 through the interconnection line by the first power generator or a change in the power to be output to the isolated island system 5 through the transmission line by the regenerable energy power generator is applied as the demand and supply imbalance of the power in the isolated island system 5.

Figure 16:
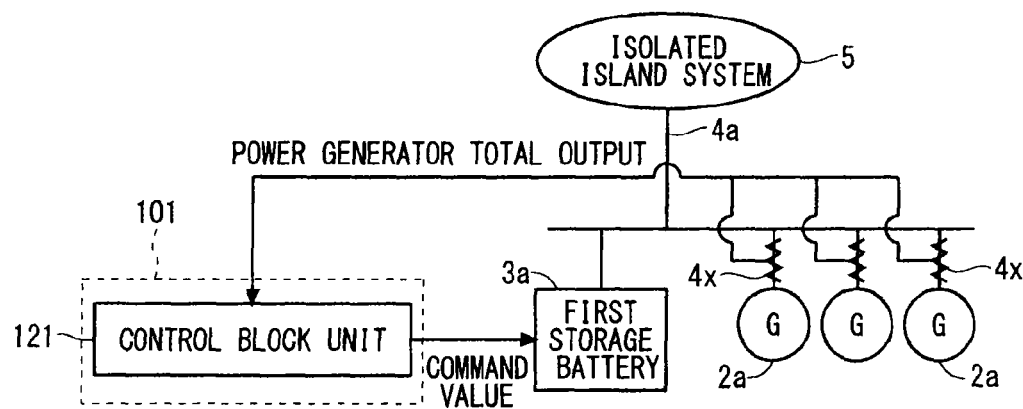

FIG. 16 is a block diagram showing structures of the frequency stabilizing apparatus 101 according to the first variant and a system stabilizing system including the same. As shown in FIG. 16, the control block unit 121 receives a measured value of power (herein, a total output of the power generator which is a sum) to be output to the isolated island system 5 through the interconnection line 4x by the first power generator 2a.

Figure 17:
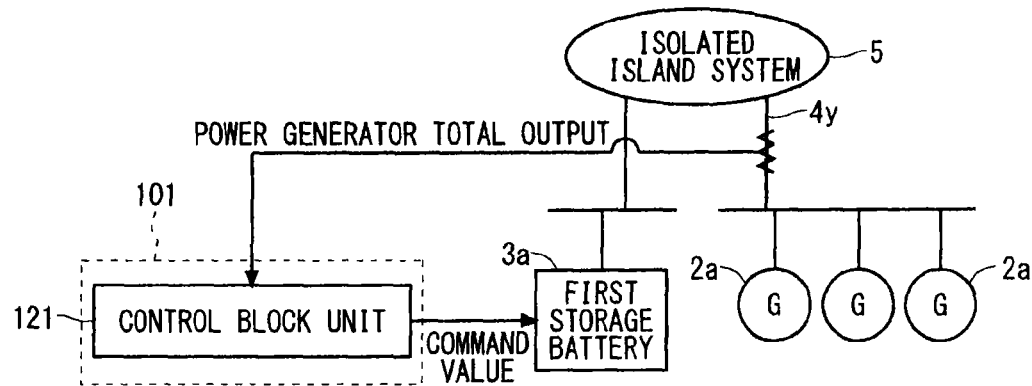

In FIG. 16, the total output of the power generator is measured on the interconnection line 4x which has not been added to the power of the first storage battery 3a in the first interconnection line 4a. However, the present invention is not restricted thereto but the total output of the power generator may be measured on an interconnection line 4y different from the interconnection line for connecting the first storage battery 3a to the isolated island system 5 as shown in FIG. 17. In FIGS. 16 and 17, for simplicity of the drawings, the input of the frequency of the power to the control block unit 121 is not shown.

Figure 18:
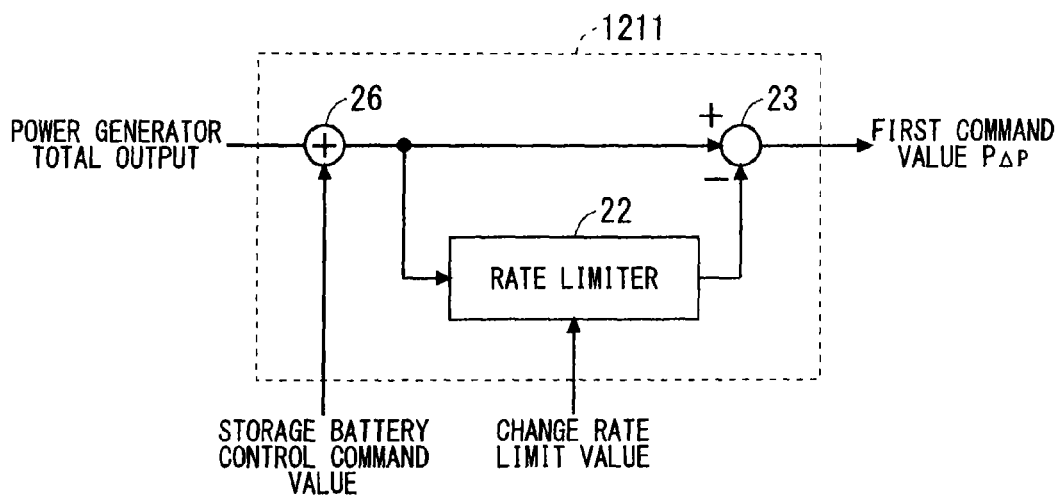

FIG. 18 is a block diagram showing a structure of a power detecting method control amount calculator 1211 provided in the control block unit 121 according to the first variant. The power detecting method control amount calculator 1211 in FIG. 18 receives the total output of the power generator and the control command value to be output from the frequency stabilizing apparatus 101 to the first storage battery 3a in place of the interconnection point tidal current value of the first interconnection line 4a in the structure of FIG. 3. In the case in which the control command value is not generated, a default value thereof is input to the power detecting method control amount calculator 1211. As shown in FIG. 18, the power detecting method control amount calculator 1211 includes an adder 26 which outputs to the rate limiter 22 a total value of the total output of the power generator and the control command value given to the first storage battery 3a in addition to the structure in FIG. 3.

Figure 19:
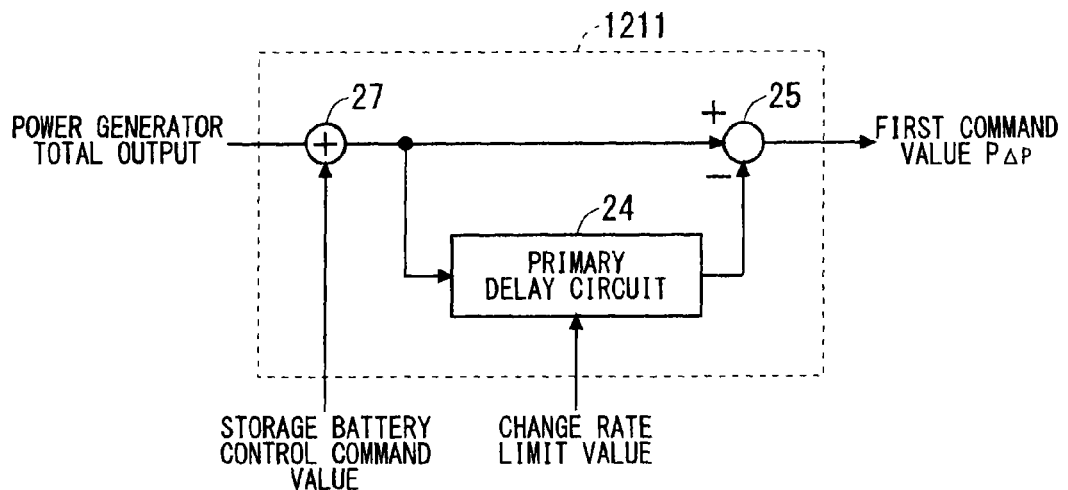

Moreover, the power detecting method control amount calculator 1211 provided in the control block unit 121 according to the first variant can also be configured as shown in FIG. 19. The power detecting method control amount calculator 1211 in FIG. 19 receives the total output of the power generator and the control command value output from the frequency stabilizing apparatus 101 to the first storage battery 3a in place of the interconnection point tidal current value of the first interconnection line 4a in the structure of FIG. 6. As shown in FIG. 19, the power detecting method control amount calculator 1211 includes an adder 27 which outputs a total value of the total output of the power generator and the control command value given to the first storage battery 3a to the primary delay circuit 24 in addition to the structure in FIG. 6.

Herein, the interconnection point tidal current value of the first interconnection line 4a is equal to the total output of the first power generator 2a and the first storage battery 3a. The output of the first power generator 2a corresponds to the total output of the power generator, and the output of the first storage battery 3a corresponds to the control command value to be given to the first storage battery 3a. For this reason, it is possible to implement the same function as that in the first preferred embodiment by using the total value of the total output of the power generator and the control command value output from the frequency stabilizing apparatus 101 to the first storage battery 3a in place of the interconnection point tidal current value of the first interconnection line 4a.

Thus, in place of the change in the total output of the first power generator 2a and the first storage battery 3a at the interconnection point, the change in the power to be output to the isolated island system 5 through the interconnection line by the first power generator 2a may be used as the demand and supply imbalance (demand fluctuation) of the power in the isolated island system 5. The first variant can also be applied to the case in which the first power generator 2a is connected to the isolated island system 5 in a distant place from the first storage battery.

FIG. 20 is a block diagram showing other structures of the frequency stabilizing apparatus 101 according to the first variant and the system stabilizing system including the same. With the structures shown in FIG. 20, the first generator 2a in FIG. 17 is replaced with a regenerable energy power generator 2x and a load 2y and the interconnection line 4y in FIG. 17 is replaced with a transmission line 4z. Even if equipment which is not a source of the power fluctuation, for example, a load, a power generator or the like is connected ahead of the transmission line 4z, there is no problem.

It is assumed that the control block unit 121 receives a measured value of power (a tidal current value of the transmission line) to be output to the isolated island system 5 through the transmission line 4z by the regenerable energy power generator 2x. Moreover, it is assumed that the structure of FIG. 19 is applied to the structure of the power detecting method control amount calculator 1211, for example.

With a structure in which a total value of the tidal current value of the transmission line and the control command value output from the frequency stabilizing apparatus 101 to the first storage battery 3a is used in place of the interconnection point tidal current value of the first interconnection line 4a as in the structures of FIG. 20, it is possible to implement the same function as that in the first preferred embodiment.

Thus, in place of the change in the total output of the first power generator 2a and the first storage battery 3a at the interconnection point, the change in the power to be output to the isolated island system 5 through the transmission line by the regenerable energy power generator 2x may be used as the demand and supply imbalance (the demand fluctuation) of the power in the isolated island system 5. According to the first variant, a target compensated by the output of the first storage battery 3a (a power fluctuation absorbing target) cannot be restricted to the whole isolated island system 5 but a part of the isolated island system 5 (an influence portion on a measuring target transmission line of a power fluctuation target which influences the measuring target transmission line).

The above description has been given to the structure in which a change in the measured value of the interconnection point tidal current value of the first interconnection line 4a, a change in the measured value of the power to be output by the first power generator 2a or a change in the measured value of the power to be output by the regenerable energy power generator 2x installed in the isolated island system 5 is applied to the demand and supply imbalance of the power in the isolated island system 5. However, the present invention is not restricted to these measured values but a value to influence the frequency fluctuation of the isolated island system 5, for example, a change in the measured value of the demand in the isolated island system 5, a change in these estimated values or the like can be applied to the demand and supply imbalance of the power in the isolated island system 5. In other words, the change in the power of the transmission line 4z in the isolated island system 5 may be used to estimate the demand and supply balance.

In the above description, the demand and supply imbalance is estimated by using output power of power generator or power of a transmission line including the output power, the power generator being connected into the isolated system and converting rotational energy into electric energy. However, the present invention is not restricted thereto but the demand and supply imbalance may be estimated by using both of them.

Moreover, although the first variant is applied to the first preferred embodiment in the above description, the present invention is not restricted thereto but can also be applied to preferred embodiments which will be explained below, for example.

Second Preferred Embodiment

Figure 21:
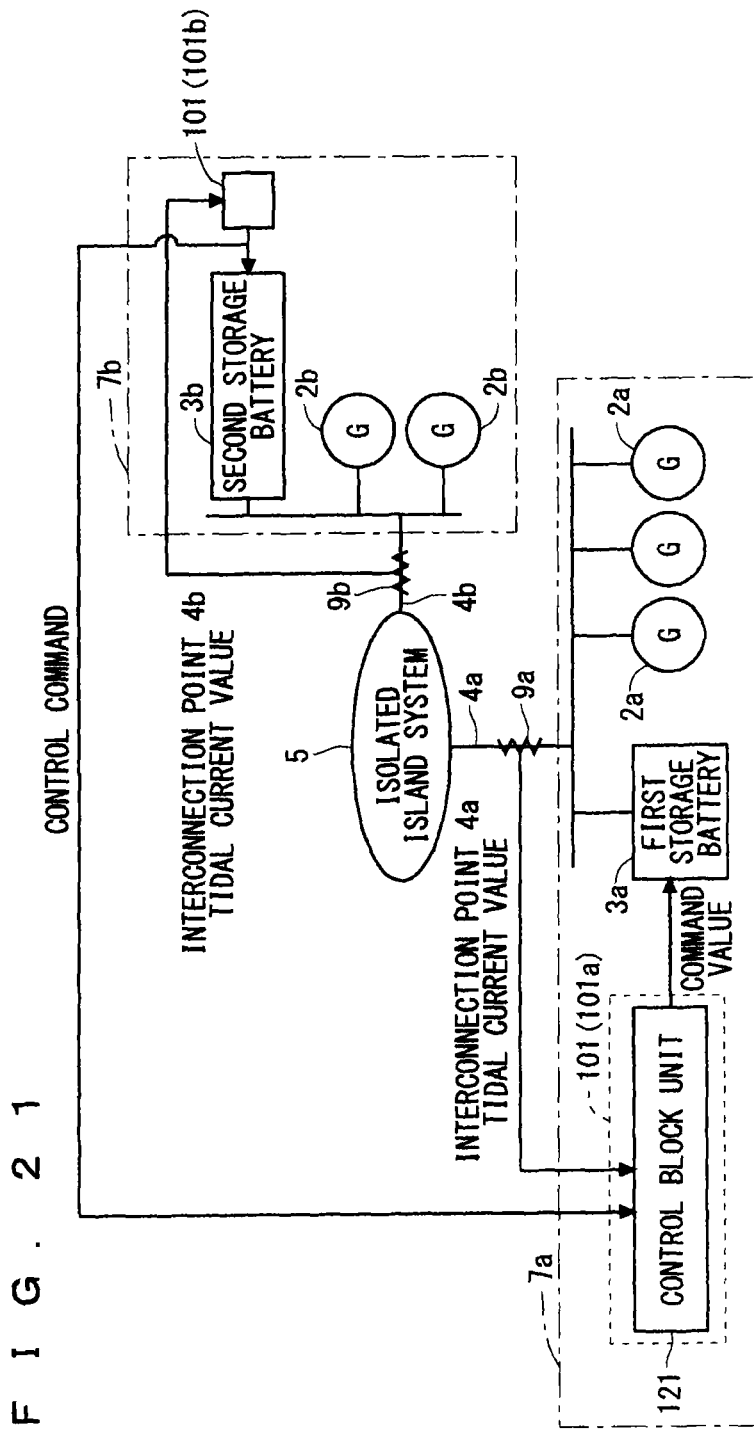
FIG. 21 is a block diagram showing structures of frequency stabilizing apparatus according to second or fourth preferred embodiments.

FIG. 21 is a block diagram showing structures of a frequency stabilizing apparatus 101 according to a second preferred embodiment of the present invention and a system stabilizing system including the same. In the frequency stabilizing apparatus 101 according to the second preferred embodiment, the same or similar components as or to the components described above have the same reference numerals and different portions will be mainly explained.

In the frequency stabilizing apparatus 101 according to the first preferred embodiment, if an isolated island system 5 to be a power system fluctuates, control for a first storage battery 3a is also changed naturally. As will be described below in detail, however, if an abnormality or a connection change occurs in a portion in which an interconnection point tidal current value is measured in a first interconnection line 4a or occurs in a power system or power equipment at a first power generator 2a side from the same portion, a power detecting method control amount calculator 1211 unnecessarily changes a power detecting method output $P_{AP}$ (a first command value). As a result, there is a possibility that the frequency stabilizing apparatus 101 might carry out unnecessary control over the first storage battery 3a.

The reason why the unnecessary control is performed over the first storage battery 3a as described above is as follows. A power detecting method (an interconnection point tidal current detecting method) has an object to, by measuring an interconnection point tidal current, detect a demand change in the isolated island system 5, an output change in regenerable energy, a power demand and supply change caused by an accident or a failure, or the like. For this reason, there is a possibility that an unnecessary control amount might be calculated if the interconnection point tidal current is varied in a different phenomenon from a power fluctuation in the isolated island system 5. In addition, demand and supply imbalance might occur over the isolated island system 5 depending on the calculated control amount and a control direction (a charge/discharge direction). Consequently, there is a possibility that a frequency deviation might be generated and increased.

Therefore, according to the frequency stabilizing apparatus 101 in accordance with the second preferred embodiment shown in FIG. 21, it is possible to solve the problem. In the second preferred embodiment, another frequency stabilizing apparatus 101 (hereinafter referred to as a "second frequency stabilizing apparatus 101b"), a second power generator 2b, a second storage battery 3b and a second measuring unit 9b are connected to the isolated island system 5 through a second interconnection line 4b in the same manner as the frequency stabilizing apparatus 101 (hereinafter referred to as a "first frequency stabilizing apparatus 101a"), the first power generator 2a, the first storage battery 3a, the first interconnection line 4a and the first measuring unit 9a described in the first preferred embodiment. A second frequency stabilizing apparatus 101b is configured in the same manner as the first frequency stabilizing apparatus 101a, and the second frequency stabilizing apparatus 101b controls the input/output of the second storage battery 3b in the same manner as in the case in which the first frequency stabilizing apparatus 101a controls the input/output of the first storage battery 3a.

The first frequency stabilizing apparatus 101a, a plurality of first power generators 2a and a first storage battery 3a are provided in a local power plant 7a, and the second frequency stabilizing apparatus 101b, the plurality of second power generators 2b and the second storage battery 3b are provided in an external power plant 7b.

The number of the second power generators 2b to be an external power generator may be one or more if the second power generators 2b is a local generator connected to the isolated island system 5 other than the first power generator 2a. Similarly, the number of each of the second frequency stabilizing apparatuses 101b, the second storage batteries 3b and the second interconnection lines 4b may be one or more. In the following, although the number of the second power generators 2b to be the external power generators is set to be the number obtained by excluding the number of the first power generators 2a in all of the power generators connected to the isolated island system 5 as an example, the present invention is not restricted thereto.

In the same manner as in the first preferred embodiment, the first frequency stabilizing apparatus 101a receives an interconnection point tidal current value and a power frequency of the first interconnection line 4a, and the second frequency stabilizing apparatus 101b receives an interconnection point tidal current value and a power frequency of the second interconnection line 4b. In the second preferred embodiment, the first frequency stabilizing apparatus 101a receives a command value from the first frequency stabilizing apparatus 101a to the first storage battery 3a and a command value from the second frequency stabilizing apparatus 101b to the second storage battery 3b.

Figure 22:
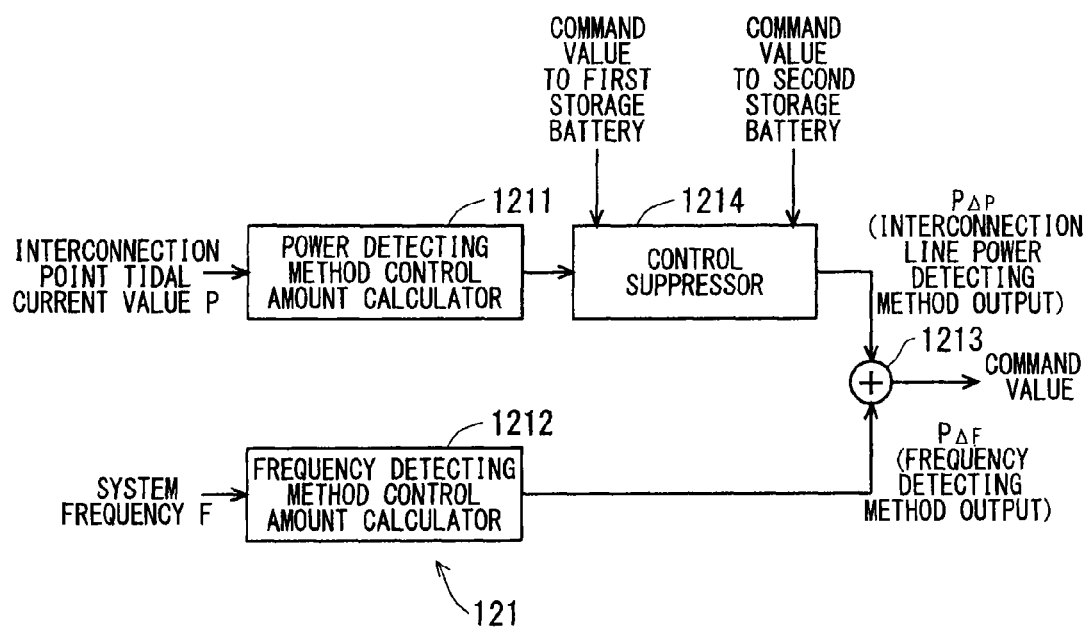
FIG. 22 is a block diagram showing the structure of the frequency stabilizing apparatus according to the second preferred embodiment.

FIG. 22 is a block diagram showing a structure of a control block unit 121 of the first frequency stabilizing apparatus 101a according to the second preferred embodiment. As shown in FIG. 22, the control block unit 121 includes a control suppressor 1214 in addition to the structure of FIG. 5. The control suppressor 1214 receives a command value output from the first frequency stabilizing apparatus 101a to the first storage battery 3a and a command value output from the second frequency stabilizing apparatus 101b to the second storage battery 3b. However, the present invention is not restricted thereto but the control suppressor 1214 may receive operating information of the first power generator 2a and an interconnection point tidal current value of the first interconnection line 4a which are a source of a command value to be output to the first storage battery 3a in place of the same command value. Similarly, the control suppressor 1214 may receive operating information of the second power generator 2b and an interconnection point tidal current value of the second interconnection line 4b which are a source of a command value to be output to the second storage battery 3b in place of the same command value.

As will be described below, in the case in which an abnormality occurs or a connection change is carried out in a first portion where the interconnection point tidal current value is measured in the first interconnection line 4a or a second portion near the first power generator 2a rather than the first portion, control directions (charge/discharge directions) for the command values to the first storage battery 3a and the second storage battery 3b are different from each other or mutual command values greatly deviate from each other.

For this reason, the command values for the first storage battery 3a and the second storage battery 3b are used as system information about the abnormality or the connection change in the first portion where the inter connection point tidal current value is measured in the first interconnection line 4a or the second portion near the first power generator 2a rather than the first portion. Herein, a failure of an interconnection point tidal current measuring unit, a failure such as a ground fault, an erroneous output of the first storage battery 3a or a reduction in an output caused by the failure of the first power generator 2a is supposed as the abnormality, for example, and addition of connection of a transmission line making a detour around an interconnection point or the like is supposed as the connection change, for example.

Operation Example 1 According to Second Preferred Embodiment

Description will be given to an operation example 1 of the first frequency stabilizing apparatus 101a according to the second preferred embodiment.

When a demand is usually decreased rapidly in the isolated island system 5, the interconnection point tidal current value of the first interconnection line 4a is decreased rapidly, and furthermore, the interconnection point tidal current value of the second interconnection line 4b is also decreased rapidly. Therefore, in this case, the first frequency stabilizing apparatus 101a outputs a charging command to the first storage battery 3a, and the second frequency stabilizing apparatus 101b also outputs a charging command to the second battery 3b. In other words, the control direction (charge) of the command value for the first storage battery 3a and the control direction (charge) of the command value for the second storage battery 3b are usually coincident with each other.

On the other hand, when the interconnection point tidal current value of the first interconnection line 4a is rapidly decreased without a fluctuation in a demand in the isolated island system 5 in an abnormal case such as a failure of the first interconnection line 4a, it is necessary to increase the interconnection point tidal current value of the second interconnection line 4b in order to compensate for the same. Consequently, the first frequency stabilizing apparatus 101a outputs a charging command to the first storage battery 3a in the same manner as described above due to the rapid decrease in the interconnection point tidal current value of the first interconnection line 4a, and the second frequency stabilizing apparatus 101b outputs a discharging command to the second storage battery 3b differently from the above description. In other words, in the abnormal case, the control direction (charge) of the command value for the first storage battery 3a is reverse to the control direction (discharge) of the command value for the second storage battery 3b.

Therefore, the control suppressor 1214 of FIG. 22 exactly outputs a power detecting method output $P_{AP}$ of the power detecting method control amount calculator 1211 to a command value calculator 1213 if the control directions of the first storage battery 3a and the second storage battery 3b are coincident with each other, and reduces the power detecting method output $P_{AP}$ of the power detecting method control amount calculator 1211 in the first frequency stabilizing apparatus 101a and outputs the power detecting method output $P_{AP}$ to the command value calculator 1213 if the control directions of the first storage battery 3a and the second storage battery 3b are different from (reverse to) each other. In other words, the control suppressor 1214 suppresses the control (control amount) corresponding to the power detecting method output $P_{Ap}$ based on system information (the command values for the first storage battery 3a and the second storage battery 3b).

In the case of the abnormality near the isolated island system 5 rather than the portion where the interconnection point tidal current value is measured in the first interconnection line 4a (for example, the failure of the second power generator 2b) or the connection change in the isolated island system, compensation is carried out by the control of each of the other stabilizing apparatuses such as the second frequency stabilizing apparatus 101b. Therefore, it is not necessary to reduce the control amount through the power detecting method control amount detector 1211 of the first frequency stabilizing apparatus 101a.

Operation Example 2 According to Second Preferred Embodiment

Description will be given of an operation example 1 of the first frequency stabilizing apparatus 101a according to the second preferred embodiment.

It is assumed that the first power generator 2a and the first storage battery 3a shown in FIG. 21 are connected to the isolated island system 5 so that the first power generator 2a and the first storage battery 3a can be shielded from and transmit power to the isolated island system 5 via a transmission line without the first interconnection line 4a (a bus) and the first measuring unit 9a The transmission line is usually opened to disable the power transmission. Therefore, power from the first power generator 2a and the first storage battery 3a is output to the isolated island system 5 via the first interconnection 4a.

However, in the case where the disconnection of a cutoff machine of the transmission line is made invalid for some reason so that the power transmission is enabled, the power is output from the first power generator 2a and the first storage battery 3a to the isolated island system 5 through the transmission line in addition to the first interconnection line 4a, though there is not a particular change in the power in the isolated island system 5. In this case, the interconnection point tidal current value of the first interconnection line 4a (the measured value of the first measuring unit 9a) is decreased rapidly, and the interconnection point tidal current value of the second interconnection line 4b (the measured value of the second measuring unit 9b) is not changed. Consequently, the first frequency stabilizing apparatus 101a outputs the charging command to the first storage battery 3a in the same manner as described above due to the rapid decrease in the interconnection point tidal current value of the first interconnection line 4a, and the second frequency stabilizing apparatus 101b does not output a particular control command to the second storage battery 3b differently from the foregoing. In other words, in the abnormal case, the control direction (charge) of the command value for the first storage battery 3a is different from the control direction (no control direction) of the command value for the second storage battery 3b.

The control suppressor 1214 in FIG. 22 exactly outputs the power detecting method output $P_{AP}$ of the power detecting method control amount calculator 1211 to a command value calculator 1213 if the control directions of the first storage battery 3a and the second storage battery 3b are coincident with each other, and reduces the power detecting method output $P_{AP}$ of the power detecting method control amount calculator 1211 and outputs the power detecting method output $P_{AP}$ to the command value calculator 1213 if the control directions of the first storage battery 3a and the second storage battery 3b are not coincident with each other. In other words, the control suppressor 1214 suppresses the control corresponding to the power detecting method output $P_{AP}$ based on system information (the command values for the first storage battery 3a and the second storage battery 3b).

<Effect>

According to the frequency stabilizing apparatus 101 in accordance with the second preferred embodiment described above, the control corresponding to the power detecting method output $P_{AP}$ is suppressed based on system information about a failure of power equipment such as a power generator, a storage battery, a transmission line or a transformer and the connection change of the isolated island system (power system) 5 which is not supposed. Also in the case in which the power detecting method control amount calculator 1211 calculates an unnecessary control amount, accordingly, it is possible to suppress unnecessary control caused by the calculation.

<First Variant>

In addition, a method of determining the necessity of the suppression for the control amount in the power detecting method control amount calculator 1211 using another measured value includes a method using a system frequency as system information. This method can also be implemented with the structure in which one frequency stabilizing apparatus 101 is provided as shown in FIG. 10. The power detecting method has a feature that an operation can be carried out at a high speed before a fluctuation in a frequency. However, in the case in which unnecessary control such as control in a charge/discharge direction opposite to necessary control is executed, demand and supply balance cannot be taken so that the frequency gradually fluctuates. More specifically, the frequency is unnecessarily raised by unnecessary discharge and the frequency is unnecessarily reduced by the unnecessary charge. Therefore, in the first variant, a malfunction is detected by a rise in the frequency in the discharging control or a reduction in the frequency in the charging control.

Figure 23:
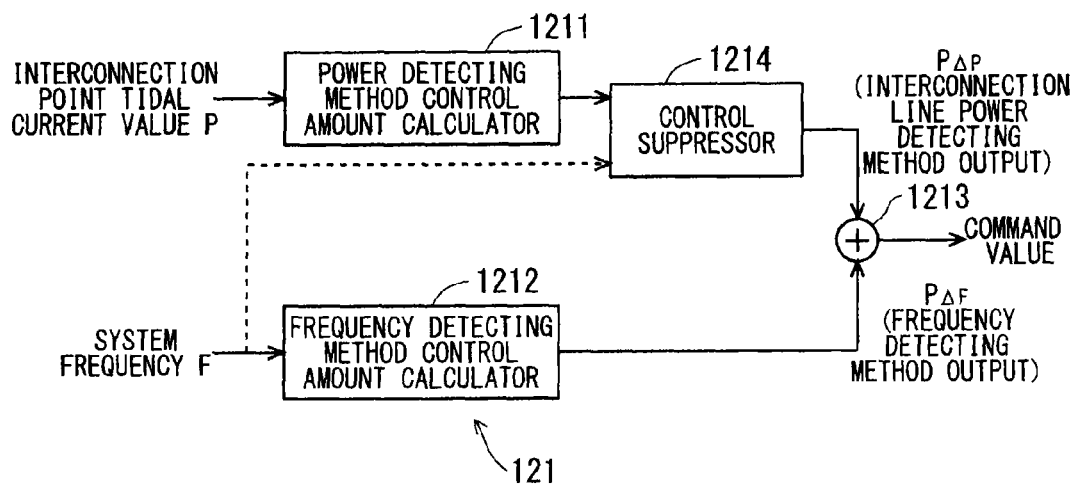
FIG. 23 is a block diagram showing a structure of a frequency stabilizing apparatus according to a first variant of the second preferred embodiment.

For example, as shown in FIG. 23, there is employed a structure in which a system frequency is input to the control suppressor 1214. Consequently, it is possible to suppress the unnecessary control through the power detecting method control amount calculator 1211. More specifically, the control suppressor 1214 controls the power detecting method output $P_{AP}$ in order to stop the discharge when the frequency is higher than a reference frequency and to stop the charge when the frequency is lower than the reference frequency, thereby suppressing an unnecessary operation.

The system frequency is changed moment by moment. For this reason, it is also possible to set a dead zone. Therefore, the discharge is stopped when a frequency deviation is equal to or greater than a certain value (for example: 0.01) and the charge is stopped when the frequency deviation is smaller than a certain value (for example: −0.01).

Moreover, the power detecting method output $P_{AP}$ of the power detecting method control amount calculator 1211 may be limited in accordance with a frequency deviation ($\Delta F$) as shown in FIG. 24, for example. In FIG. 24, the discharge is inhibited from being performed by the power detecting method output $P_{AP}$ if the frequency deviation exceeds F11 (for example, 0.1 [Hz]), and the charge is inhibited from being performed by the power detecting method output $P_{AP}$ if the frequency deviation is below F21 (for example, −0.1 [Hz]). If the frequency deviation is between F11 and F21, the discharge and the charge through the power detecting method output $P_{AP}$ are restricted depending on the frequency deviation. For example, the discharge and the charge are restricted to be a half of a discharge limit and a charge limit, respectively. When the frequency deviation exceeds F22, the charge through the power detecting method output $P_{AP}$ is enabled up to the charge limit. When the frequency deviation is below F12, the discharge through the power detecting method output $P_{AP}$ is enabled up to the discharge limit.

A way for using a frequency (a method of determining a threshold corresponding to a frequency or a function indicative of a threshold) is not restricted to the foregoing but many variations can be supposed.

<Second Variant>

Moreover, there is a method of causing the frequency stabilizing apparatus 101 to receive, as system information, failure occurrence information in a power generator, a storage battery or a power transmission place. This method can also be implemented with the structure in which one frequency stabilizing apparatus 101 is provided as shown in FIG. 10. In this case, the control suppressor 1214 can acquire, as the system information, failure occurrence information of a power system or power equipment in a portion where the interconnection point tidal current value is measured in the first interconnection line 4a or near the first power generator 2a rather than the portion, and can determine a control amount calculated at that time as unnecessary control.

When receiving the failure occurrence information, the control suppressor 1214 calculates the possibility of an unnecessary operation to stop or suppress the power detecting method output $P_{\Delta P}$ of the power detecting method control amount calculator 1211. Alternatively, the control suppressor 1214 may stop or suppress the power detecting method output $P_{\Delta P}$ based on the failure occurrence information and the system frequency.

In the above description, the system power information is set to be the failure occurrence information in the power system or power equipment in the portion where the interconnection point tidal current value is measured in the first interconnection line 4a or near the first power generators 2a rather than the portion. However, the present invention is not restricted thereto but the system power information is set to be the failure occurrence information in the first interconnection line 4a or near the first power generators 2a and first storage battery 3a rather than the same portion.

In the above description, system information related to the abnormality or the connection change in the first portion where the inter connection point tidal current value is measured in the first interconnection line 4a or the second portion near the first power generator 2a rather than the first portion, is used. However, the present invention is not restricted thereto but, in place of the system information, system information related to the abnormality or the connection change, in the first portion where at least one of the output power of the power generator and the power of the transmission line including the output power is measured, or the second portion at the power generator side from the first portion, may be used.

Third Preferred Embodiment

FIG. 25 is a block diagram showing structures of a frequency stabilizing apparatus 101 according to a third preferred embodiment of the present invention and a system stabilizing system including the same. In the frequency stabilizing apparatus 101 according to the third preferred embodiment, the same or similar components as or to the components described above have the same reference numerals and different portions will be mainly explained.

As shown in FIG. 25, in the third preferred embodiment, a second frequency stabilizing apparatus 101b and a second storage battery 3b are not connected to an isolated island system 5 through a second interconnection line 4b, and a second power generator 2b is connected to the isolated island system 5 through the second interconnection line 4b. In other words, power can be supplied to the isolated island system 5 from the second power generator 2b different from a first power generator 2a through the separate second interconnection line 4b different from a first interconnection line 4a. In the structure, the first power generator 2a to be a local power generator and the second power generator 2b to be an external power generator response to a demand and supply imbalance amount of the power in the isolated island system 5.

Herein, a power value measured by a first measuring unit 9a in the first interconnection line 4a has only a responding portion of the first power generator 2a and does not have a response portion to the demand and supply imbalance amount of the whole isolated island system 5 (a response portion of the first and second power generators 2a and 2b). For this reason, in the case in which the frequency stabilizing apparatus 101 according to the first preferred embodiment is adapted, the first storage battery 3a can compensate for only the response portion of the first power generator 2a.

Therefore, according to the frequency stabilizing apparatus 101 in accordance with the third preferred embodiment, the first storage battery 3a can compensate for the response portion to the demand imbalance amount of the whole isolated island system 5 (the response portion for both of the first and second power generators 2a and 2b).

As a premise, all of the power generators in the isolated island (herein, the first and second power generators 2a and 2b) are set at an equal change rate also in the case in which equipment capacities are different from each other. Moreover, it is assumed that a demand and supply controller 6 also manages the operating state of the second power generator 2b other than the operating state of the first power generator 2a and performs output control for the first and second power generators 2a and 2b.

A parameter determining unit 11 calculates an output change rate limit value in accordance with the following equation 2 based on the operating information of the first and second power generators 2a and 2b sent from the demand and supply controller 6. The rate limit value in the equation 2 is recorded in the recorder 12 (FIG. 2) in the same manner as described above, and a total rated output of the power generators which are being operated in all power plants is included in the operating information of the first and second power generators 2a and 2b.

[Equation 2]

$$\text{Change rate limit value} = \text{"rate limit value"} \times \text{"total rated output of power generators which are being operated in all power plants"} \quad (2)$$

Moreover, the parameter determining unit 11 calculates a gain set value in accordance with the following equation 3 based on the operating information of the first and second power generators 2a and 2b sent from the demand and supply controller 6. Herein, the gain set value is a parameter for calculating a response portion to a demand and supply imbalance amount in the whole system from the measured value of the interconnection point tidal current value in the power plant 7a. The total rated output of the power generators which are being operated in the local power plant 7a is included in the operating information of the first power generator 2a.

[Equation 3]

$$\text{Gain set value} = \frac{\text{Total rated output of power generators which are being operated in all power plants}}{\text{Total rated output 1 of power generators which are being operated in a local power plant}} \quad (3)$$

Figure 26:
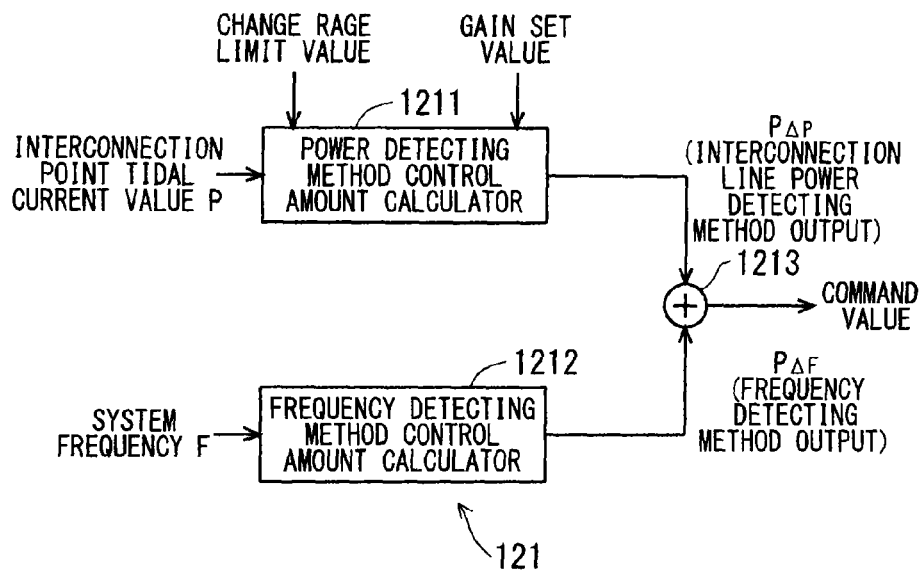
Figure 27:
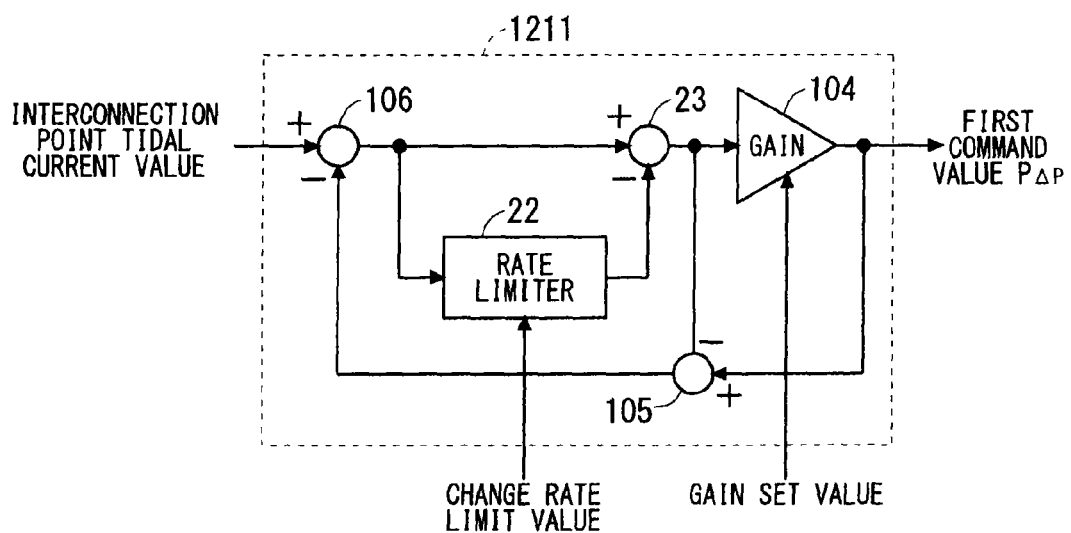
Figure 28A:
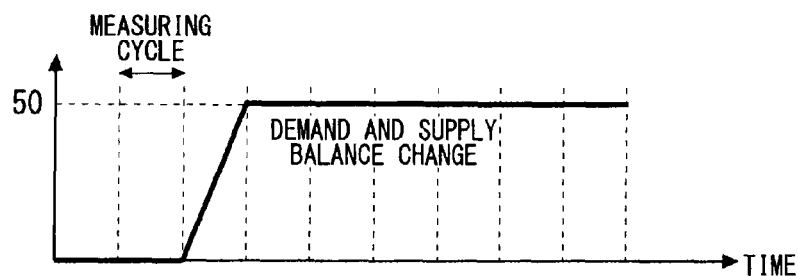
FIGS. 28A to 28D are charts each showing an operation result of the frequency stabilizing apparatus according to the third preferred embodiment.
Figure 28B:
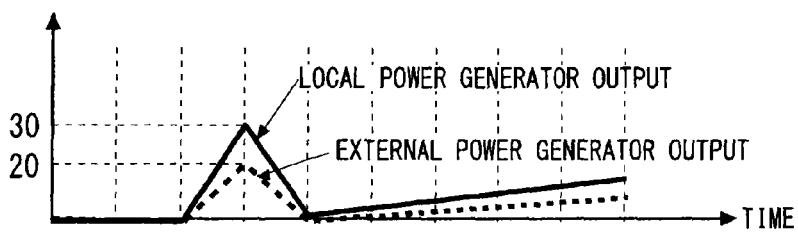
Figure 28C:
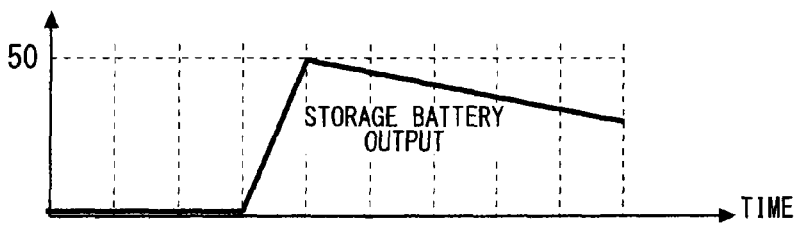
Figure 28D:
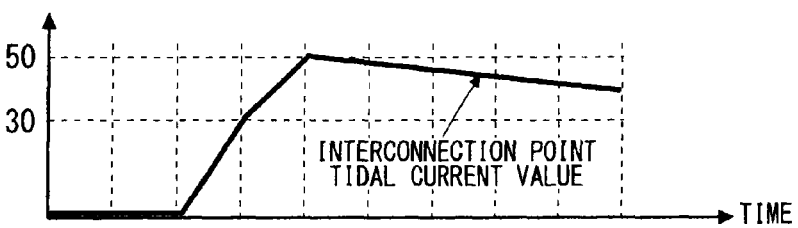

FIG. 26 is a block diagram showing a structure of a control block unit 121 according to the third preferred embodiment, and FIG. 27 is a block diagram showing a structure of a power detecting method control amount calculator 1211 according to the third preferred embodiment.

As shown in FIGS. 26 and 27, the power detecting method control amount calculator 1211 receives a measured value of an interconnection point tidal current value, and a change rate limit value and a gain set value sent from the parameter determining unit 11. As shown in FIG. 27, the power detecting method control amount calculating unit 1211 is obtained by adding a gain circuit 104, a subtracter 105 and a subtracter 106 to the power detecting method control amount calculator 1211 described in the first preferred embodiment (FIG. 3).

The gain circuit 104 amplifies a control signal of a subtracter 23 with a gain set value input from the parameter determining unit 11. This is intended for calculating a demand and supply imbalance amount in the whole isolated island system 5 from the information measured by the local power plant 7*a*. Consequently, a control command for the first storage battery 3*a* (an output of the power detecting method control amount calculator 1211) stabilizes a frequency of the whole system.

On the other hand, since the output of the first storage battery 3*a* is added to the output of the local power plant 7*a*, the output of the first storage battery 3*a* influences the interconnection point tidal current value measured on the interconnection point (the input of the power detecting method control amount calculator 1211). The subtracter 105 and the subtracter 106 are added to correct them. In other words, the subtracter 105 subtracts a signal which is not multiplied by the gain set value and a signal multiplied by the gain set value. Consequently, there is acquired, as a difference value, an increased portion in case of increasing the output of the first storage battery 3*a* to stabilize the whole isolated island system 5. By using the subtracter 106, the difference value is subtracted from the interconnection point tidal current value (the input of the power detecting method control amount calculator 1211) so that a signal indicative of the interconnection point tidal current value to be originally measured is input to the rate limiter 22.

The power detecting method control amount calculator 1211 having the structure described above generates the electric detecting method output $P_{AP}$ (the first command value) based on the change in the interconnection point tidal current value (the demand and supply imbalance) of the first interconnection line 4*a*, the change rate limit value (the value corresponding to the operating information of the first and second power generators 2*a* and 2*b*) and the gain set value (the value corresponding to the operating information of the first and second power generators 2*a* and 2*b*).

Operation Example of Third Preferred Embodiment

Next, description will be given to an operation example of the power detecting method control amount calculator 1211 according to the third preferred embodiment.

The first power generator 2*a* to be the local power generator and the second power generator 2*b* to be the external power generator share an output for the stepped change in the demand and supply balance by depending on the operating state. The ratio is determined by a ratio of a rated output of the first power generator 2*a* and the second power generator 2*b*. For example, in the case in which the total rated output of the first power generator 2*a* is 60 and the total rated output of the second power generator 2*b* is 40, the gain set value is calculated as 100/60=1.67 by the parameter determining unit 11.

As shown in FIGS. 28A to 28D, when the demand and supply balance is changed by 50, the first power generator 2*a* is operated by 30 and the second power generator 2*b* is operated by 20 immediately thereafter so that a change amount of the first power generator 2*a* is reflected on the inter connection point tidal current. A value obtained through a multiplication of 30 by 1.67, that is, 50 is output from the first storage battery 3*a*. The demand and supply balance change amount and the output of the first storage battery 3*a* are coincident with each other. Therefore, both of the outputs of the first and second power generators 2*a* and 2*b* are returned to be almost zero.

Consequently, both of the outputs of the first and second power generators 2*a* and 2*b* are adjusted to take the demand and supply balance. As a result, the output of the first storage battery 3*a*, that is, 50 is measured as the interconnection point tidal current value of the first interconnection line 4*a*.

Herein, the signals before and after the amplification in the gain circuit 104 are 30 and 50 and the output of the subtracter 105 is 20. The subtracter 106 subtracts 20 from 50 of the interconnection point tidal current. Therefore, the input from the subtracter 106 to the rate limiter 22 and the input from the subtracter 106 to the subtracter 23 are 30. It is apparent that this state is identical to a value obtained immediately after a demand fluctuation and an operation can be stably carried out by the control.

<Effect>

According to the third preferred embodiment described above, information is input in cooperation with the demand and supply control system. Consequently, in consideration of the change in the numbers of the first and second power generators 2*a* and 2*b* to be operated for a demand varied moment by moment, the control parameter of the frequency stabilizing apparatus 101 required for stably maintaining the frequency of the isolated island system 5 is properly set. Accordingly, also in the case in which the external power generator (the second power generator 2*b*) is present in addition to the local power plant 7*a* to which the frequency stabilizing apparatus 101 is set, it is possible to properly respond to the demand change amount by the first storage battery 3*a*.

Fourth Preferred Embodiment

FIG. 21 is a block diagram showing structures of a frequency stabilizing apparatus 101 according to a fourth preferred embodiment of the present invention and a system stabilizing system including the same. In the frequency stabilizing apparatus 101 according to the fourth preferred embodiment, the same or similar components as or to the components described above have the same reference numerals and different portions will be mainly explained.

As shown in FIG. 21, in the fourth preferred embodiment, a second frequency stabilizing apparatus 101*b*, a second power generator 2*b*, a second storage battery 3*b* and a second measuring unit 9*b* are connected to an isolated island system 5 through a second interconnection line 4*b*. In other words, the second storage battery 3*b* different from a first storage battery 3*a* is connected to the isolated island system 5 and power can be supplied from the second storage battery 3*b*.

As will be described below, according to the fourth preferred embodiment, the first storage battery 3*a* and the second storage battery 3*b* can compensate for a response portion to a demand and supply imbalance amount (a demand fluctuation amount) of the whole isolated island system 5 (a response portion of both of the first and second power generators 2*a* and 2*b*) also in the case in which a storage battery and a frequency stabilizing apparatus are provided in an external power plant 7*b* in addition to a local power plant 7*a*.

As shown in FIG. 21, a first frequency stabilizing apparatus 101*a* determines a control command value of the first storage battery 3*a* based on an interconnection point tidal current value measured by a first interconnection line 4*a* (a value including at least power to be output to the isolated island system 5 through the interconnection line 4*a* by the first power generator 2*a*) in the same manner as the frequency stabilizing apparatus described in the first preferred embodiment. Moreover, the second frequency stabilizing apparatus 101*b* also determines (generates) a control command value of the second storage battery 3*b* based on an interconnection point tidal current value measured by a second interconnection line 4*b* (a value including at least power to be output to the isolated island system 5 through the second interconnection line 4*b* by the second power generator 2*b* as described above). By such an operation, it is possible to properly stabilize a frequency without causing deficiency and excess of control even if the first frequency stabilizing apparatus 101*a* and the second frequency stabilizing apparatus 101*b* do not exchange information each other. Although the first frequency stabilizing apparatus 101*a* and the second frequency stabilizing apparatus 101*b* are provided individually, the present invention is not restricted thereto but they may be provided integrally.

<Effect>

According to the fourth preferred embodiment described above, in consideration of the change in the numbers of the first and second power generators 2*a* and 2*b* to be operated for the demand varied moment by moment, the control command value of the frequency stabilizing apparatus 101 required for stably maintaining the frequency of the isolated island system 5 is determined properly. Therefore, also in the case in which the external power generator (the second power generator 2*b*), the frequency stabilizing apparatus (the second frequency stabilizing apparatus 101*b*) and the external storage battery (the second storage battery 3*b*) are present in addition to the local power plant 7*a*, it is possible to properly respond to the demand change amount by the first and second storage batteries 3*a* and 3*b*.

While the invention has been shown and described in detail, the foregoing description is in all aspects illustrative and not restrictive. It is therefore understood that numerous modifications and variations can be devised without departing from the scope of the invention.

What is claimed is:

1. A frequency stabilizing apparatus for an isolated system, which gives a command value to a storage battery capable of adjusting power on an isolated system for power supply, said apparatus comprising:
   a first calculator which generates a first command value based on an estimated demand and supply imbalance of power in said isolated system;
   a second calculator which generates a second command value based on a change in a frequency of the power in said isolated system;
   a command value calculator which generates the command value to be given to said storage battery based on said first command value generated by said first calculator and said second command value generated by said second calculator; and
   a control suppressor which suppresses control corresponding to said first command value in a case where a control direction of a command value for said storage battery is different from a control direction of a command value for a different storage battery capable of adjusting power on said isolated system.

2. The frequency stabilizing apparatus for an isolated system according to claim 1, wherein
   a change in power of a transmission line in said isolated island system is used to estimate said demand and supply imbalance.

3. The frequency stabilizing apparatus for an isolated system according to claim 1, wherein a different storage battery being different from said storage battery is connected to said isolated system, and
   said first calculator generates said first command value of said storage battery based on an interconnection point tidal current value including at least power output to be output to said isolated system through an interconnection line by a first power generator and generates said first command value of said different storage battery based on an interconnection point tidal current value including at least power to be output to said isolated system through a different interconnection line by a second power generator.

4. The frequency stabilizing apparatus for an isolated system according to claim 1, wherein a different storage battery being different from said storage battery is connected to said isolated system, and
   said first calculator generates said first command value of said storage battery based on an interconnection point tidal current value including at least power output to be output to said isolated system through an interconnection line by a power generator and generates said first command value of said different storage battery based on an interconnection point tidal current value including at least power to be output to said isolated system through a different interconnection line by a separate power generator.

5. The frequency stabilizing apparatus for an isolated system according to claim 1, wherein power can be supplied from at least a power generator through an interconnection line to said isolated system, and
   said demand and supply imbalance comprises a change in an interconnection point tidal current value including at least power to be output to said isolated system through said interconnection line by said power generator.

6. A frequency stabilizing apparatus for an isolated system, which give a command value to a storage battery capable of adjusting power on an isolated system for power supply, said apparatus comprising:
   a first calculator which generates a first command value based on an estimated demand and supply imbalance of power in said isolated system;
   a second calculator which generates a second command value based on a change in a frequency of the power in said isolated system;
   a command value calculator which generates the command value to be given to said storage battery based on said first command value generated by said first calculator and said second command value generated by said second calculator; and
   a control suppressor which suppresses control corresponding to said first command value based on a degree of deviation between a command value for said storage battery and a command value for a different storage battery capable of adjusting power on said isolated system.

7. The frequency stabilizing apparatus for an isolated system according to claim 6, wherein a change in power of a transmission line in said isolated island system is used to estimate said demand and supply imbalance.

8. The frequency stabilizing apparatus for an isolated system according to claim 6, wherein power can be supplied from at least a power generator through an interconnection line to said isolated system and power can be supplied from a separate power generator different from said power generator through a separate interconnection line from said interconnection line, and said first calculator generates said first command value based on said demand and supply imbalance, operating information of said power generator and operating information of said separate power generator.

9. The frequency stabilizing apparatus for an isolated system according to claim 6, wherein a different storage battery being different from said storage battery is connected to said isolated system, and said first calculator generates said first command value of said storage battery based on an interconnection point tidal current value including at least power output to be output to said isolated system through an interconnection line by a power generator and generates said first command value of said different storage battery based on an interconnection point tidal current value including at least power to be output to said isolated system through a different interconnection line by a separate power generator.

10. The frequency stabilizing apparatus for an isolated system according to claim 6, wherein power can be supplied from at least a power generator through an interconnection line to said isolated system, and said demand and supply imbalance comprises a change in an interconnection point tidal current value including at least power to be output to said isolated system through said interconnection line by said power generator.

* * * * *